US012772330B2

(12) United States Patent
Fu et al.

(10) Patent No.: US 12,772,330 B2
(45) Date of Patent: Oct. 20, 2026

(54) DRX CONFIGURATION METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 259 days.

(21) Appl. No.: 18/412,124

(22) Filed: Jan. 12, 2024

(65) Prior Publication Data

US 2024/0215107 A1 Jun. 27, 2024

Related U.S. Application Data

(63) Continuation of application No. PCT/CN2021/107585, filed on Jul. 21, 2021.

(51) Int. Cl.
*H04W 76/28* (2018.01)
*H04W 72/232* (2023.01)

(52) U.S. Cl.
CPC ......... *H04W 76/28* (2018.02); *H04W 72/232* (2023.01)

(58) Field of Classification Search
CPC ............... H04W 76/28; H04W 72/232; H04W 52/0216; H04W 52/0235; H04W 52/028; H04W 52/0229; Y02D 30/70
See application file for complete search history.

(56) References Cited

U.S. PATENT DOCUMENTS

| | | | | |
|---|---|---|---|---|
| 2019/0098689 | A1 | 3/2019 | Wei et al. | |
| 2020/0045768 | A1 | 2/2020 | He et al. | |
| 2020/0100184 | A1 | 3/2020 | Zhang | |
| 2020/0120596 | A1* | 4/2020 | Yu | H04W 52/0216 |
| 2020/0389933 | A1* | 12/2020 | Ang | H04W 76/28 |
| 2020/0413475 | A1 | 12/2020 | Wei et al. | |
| 2021/0144798 | A1 | 5/2021 | Jiang | |
| 2021/0176814 | A1 | 6/2021 | Shi | |

(Continued)

FOREIGN PATENT DOCUMENTS

| | | | |
|---|---|---|---|
| CN | 109246826 | A | 1/2019 |
| CN | 110637483 | A | 12/2019 |

(Continued)

OTHER PUBLICATIONS

Supplementary European Search Report in the European application No. 21950463.6, mailed on Sep. 2, 2024. 8 pages.

(Continued)

*Primary Examiner* — Chuong A Ngo
(74) *Attorney, Agent, or Firm* — Ladas & Parry LLP

(57) ABSTRACT

A DRX configuration method and apparatus, a terminal device, and a network device are provided. The method comprises: a terminal device receives first configuration information sent by a network device, the first configuration information being used for indicating one DRX configuration or a plurality of DRX configurations; the terminal device performs physical downlink control channel (PDCCH) monitoring on the basis of the one DRX configuration or the plurality of DRX configurations.

20 Claims, 6 Drawing Sheets

(56) References Cited

U.S. PATENT DOCUMENTS

| | | | |
|---|---|---|---|
| 2021/0337471 A1 | 10/2021 | Hu et al. |
| 2021/0360736 A1 | 11/2021 | Chen |
| 2022/0361285 A1 | 11/2022 | Wei et al. |

FOREIGN PATENT DOCUMENTS

| | | | | |
|---|---|---|---|---|
| CN | 110740025 A | 1/2020 | |
| CN | 111278171 A | 6/2020 | |
| CN | 115226187 B | * 10/2025 | ........ H04W 52/0274 |
| EP | 3609243 A1 | 2/2020 | |
| EP | 3840483 A1 | 6/2021 | |
| EP | 3846549 A1 | 7/2021 | |
| WO | 2020034218 A1 | 2/2020 | |

OTHER PUBLICATIONS

International Search Report in the international application No. PCT/CN2021/107585, mailed on Apr. 19, 2022. 7 pages with English translation.

Written Opinion of the International Search Authority in the international application No. PCT/CN2021/107585, mailed on Apr. 19, 2022. 6 pages with English translation.

3GPP TSG-RAN WG2 Meeting #106 R2-1905607, Reno, USA, May 13-May 17, 2019, Agenda Item: 11.11.4.4, Source: OPPO, Title: Multiple DRX configurations, Document for: Discussion, Decision. section 2-3. 4 pages.

3GPP TSG-RAN WG2 Meeting #105bis R2-1903298, Xi'an, China, Apr. 6-Apr. 12, 2019, Agenda Item: 11.11.4.4, Source: OPPO, Title: Multiple DRX configurations, Document for: Discussion, Decision. section 2-3. 4 pages.

3GPP TS 38.321 V16.4.0 (Mar. 2021), 3rd Generation Partnership Project; Technical Specification Group Radio Access Network; NR; Medium Access Control (MAC) protocol specification (Release 16). the whole document. 156 pages.

VIVO: "Initial performance evaluation results of XR", 3GPP Draft; R1-2102548, 3rd Generation Partnership Project (3GPP), Mobile Competence Centre ; 650, Route Des Lucioles ; F-06921 Sophia-Antipolis Cedex ; France,vol. RAN WG1, No. e-Meeting; Apr. 12, 2021-Apr. 20, 2021 Apr. 7, 2021 (Apr. 7, 2021), XP052177215, pp. 1-30.

Second Office Action of the European application No. 21950463.6, issued on Feb. 6, 2026.

Third Office Action of the European application No. 21950463.6, issued on Aug. 10, 2026.

* cited by examiner

DRX CONFIGURATION METHOD AND APPARATUS, TERMINAL DEVICE, AND NETWORK DEVICE

CROSS-REFERENCE TO RELATED APPLICATION

This is a continuation application of International Patent Application No. PCT/CN2021/107585, filed on Jul. 21, 2021, entitled "DRX CONFIGURATION METHOD AND APPARATUS, TERMINAL DEVICE, AND NETWORK DEVICE", the disclosure of which is hereby incorporated by reference in its entirety.

BACKGROUND

In order to save energy of a terminal device, a DRX mechanism is introduced. The network device configures a DRX configuration for the terminal device, and the terminal device uses the DRX configuration to perform the Physical Downlink Control Channel (PDCCH) monitoring and receives service data based on scheduling information carried in the monitored PDCCH.

However, the current DRX configuration cannot adapt to service data transmission. As a result, the terminal device is in an inactive state when it needs to receive the service data, which leads to the terminal device being unable to perform PDCCH monitoring, thus causing the terminal device to be unable to receive the service data; or the terminal device is in an active state when it does not need to receive service data, which leads to an invalid PDCCH monitoring and wasting the power consumption of the terminal device.

SUMMARY

Embodiments of the present disclosure relates to the technical field of mobile communication, and in particular, to a discontinuous reception (DRX) configuration method and apparatus, a terminal device and a network device.

The DRX configuration method provided by the embodiments of the present disclosure includes the following operations.

A terminal device receives first configuration information from a network device, the first configuration information indicating one DRX configuration or a plurality of DRX configurations.

The terminal device performs physical downlink control channel (PDCCH) monitoring based on the one DRX configuration or the plurality of DRX configurations.

The DRX configuration method provided by the embodiments of the present disclosure includes the following operations.

A terminal device provided by the embodiments of the present disclosure includes a processor and a memory. The memory is configured to store a computer program, and the processor implements the computer program to cause the terminal device at least to:

- receive first configuration information from a network device, wherein the first configuration information indicates one DRX configuration; and
- perform physical downlink control channel (PDCCH) monitoring based on the one DRX configuration.

A network device provided by the embodiments of the present disclosure includes a processor and a memory. The memory is configured to store a computer program, and the processor implements the computer program to cause the network device at least to:

- transmit first configuration information to a terminal device, wherein the first configuration information indicates one DRX configuration, and the one DRX configuration is used for performing physical downlink control channel (PDCCH) monitoring by the terminal device.

BRIEF DESCRIPTION OF THE DRAWINGS

The accompanying drawings illustrated herein are used to provide further understanding of the present disclosure and constitute a part of the present disclosure, and illustrative embodiments of the present disclosure and their description are used to explain the present disclosure, but do not constitute improper limitation to the present disclosure. In the accompanying drawings.

DETAILED DESCRIPTION

The technical solution of the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

Figure 1:
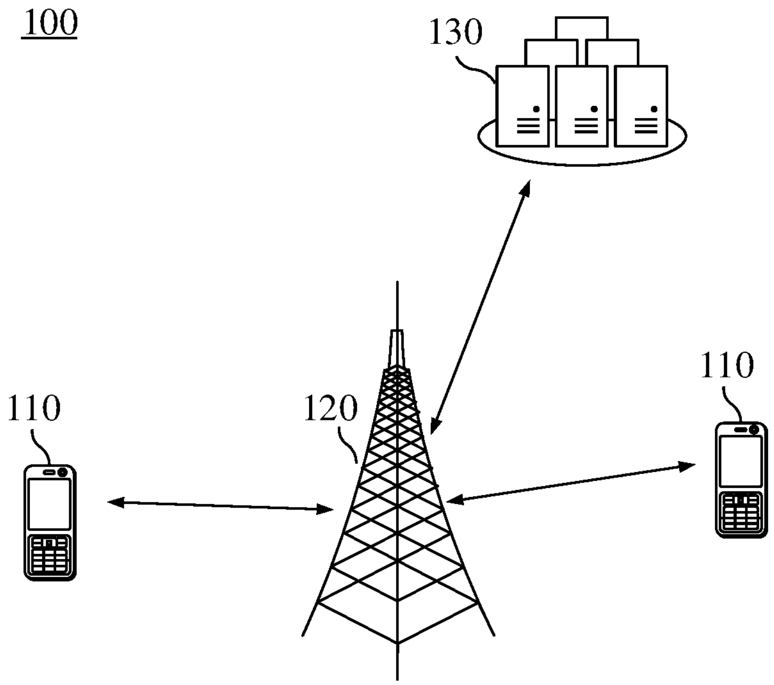
FIG. 1 is a schematic diagram of an application scenario according to an embodiment of the present disclosure.

FIG. 1 is a schematic diagram of an application scenario according to an embodiment of the present disclosure.

As illustrated in FIG. 1, the communication system 100 may include a terminal device 110 and a network device 120. The network device 120 may communicate with the terminal device 110 through an air interface. Multi-service transmission is supported between the terminal device 110 and the network device 120.

It should be understood that embodiments of the present disclosure are illustrative only with the communication system 100 but are not limited thereto. That is, the technical solution of the embodiments of the present disclosure may be applied to various communication systems, such as: a Long Term Evolution (LTE) system, an LTE Time Division Duplex (TDD), an Universal Mobile Telecommunications System (UMTS), Internet of Things (IoT) system, a Narrow Band Internet of Things (NB-IoT) system, an enhanced Machine-Type Communications (eMTC) system, a 5G communication system (also called New Radio (NR) communication system), or a future communication system, etc.

In the communication system 100 illustrated in FIG. 1, the network device 120 may be an access network device that communicates with the terminal device 110. An access network device may provide communication coverage for a particular geographic area and may communicate with a terminal device 110 (e.g. UE) located within the coverage area.

The network device 120 may be an Evolutional Node B (eNB or eNodeB) in a Long Term Evolution (LTE) system, or a gNB in a Next Generation Radio Access Network (NGRAN) device or an NR system, or a wireless controller in a Cloud Radio Access Network (CRAN), or the network device 120 may be a relay station, an access point, a vehicle-mounted device, a wearable device, a hub, a switch, a bridge, a router, or a network device in a future evolved Public Land Mobile Network (PLMN), etc.

The terminal device 110 may be any terminal device including but not limited to a terminal device in wired or wireless connection with the network device 120 or other terminal devices.

For example, the terminal device 110 may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) telephone, an IoT device, a satellite handheld terminal, a wireless local loop (WLL) station, a personal digital assistant (PDA), a handheld device with wireless communication function, a computing device or other processing device connected to a wireless modem, an in-vehicle device, a wearable device, a terminal device in future 5G network or a terminal device in the future evolved network, etc.

The terminal device 110 may be used for Device to Device (D2D) communication.

The wireless communication system 100 may also include a core network device 130 that communicates with the base station. The core network device 130 may be a 5G Core (5GC) device, for example, an Access and Mobility Management Function (AMF), another example, an Authentication Server Function (AUSF), another example, a User Plane Function (UPF), and another example, a Session Management Function (SMF). Optionally, the core network device 130 may also be an Evolved Packet Core (EPC) device of the LTE network, for example, a Session Management Function+Core Packet Gateway (SMF+PGW-C) device. It should be understood that SMF+PGW-C may achieve the same functions as SMF and PGW-C simultaneously. In the process of network evolution, the core network device may also be called by other names, or a new network entity may be formed by dividing the functions of the core network, which is not limited by the embodiments of the present disclosure.

Each functional unit in the communication system 100 may also establish a connection through a next generation (NG) interface to realize communication.

For example, the terminal device establishes air interface connection with the access network device through an NR interface for transmitting user plane data and control plane signaling. The terminal device may establish control plane signaling connection with AMF through NG interface 1 (abbreviated as N1). An access network device such as a next generation radio access base station (gNB) may establish a user plane data connection with a UPF through an NG interface 3 (abbreviated as N3). The access network device may establish control plane signaling connection with AMF through NG interface 2 (abbreviated as N2). UPF may establish control plane signaling connection with SMF through NG interface 4 (abbreviated as N4). UPF may interact user plane data with a data network through NG interface 6 (abbreviated as N6). AMF may establish control plane signaling connection with SMF through NG interface 11 (abbreviated as N11). SMF may establish control plane signaling connection with PCF through NG interface 7 (abbreviated as N7).

FIG. 1 exemplarily illustrates a base station, a core network device and two terminal devices. Optionally, the wireless communication system 100 may include multiple base stations and other numbers of terminal devices may be included within the coverage of each base station, which is not limited by embodiments of the present disclosure.

It should be noted that FIG. 1 is only illustrative of the system to which the present disclosure applies, and of course, the method illustrated in the embodiments of the present disclosure may also be applied to other systems. In addition, the terms “system” and “network” of the present disclosure are often used interchangeably herein. In the present disclosure, the term “and/or” is used to describe an association relationship of associated objects, and represents that there may be three relationships. For example, A and/or B may represent the following three situations: i.e., independent existence of A, existence of both A and B and independent existence of B. In addition, the character “f” in the present disclosure generally represents that an “or” relationship is formed between the previous and next associated objects. It should be understood that the reference to “indicate” in embodiments of the present disclosure may be a direct indication, may be an indirect indication, or may indicate an association relationship. For example, A indicates B, which can mean that A directly indicates B, for example, B can be obtained through A. It can also mean that A indirectly indicates B, for example, A indicates C, and B can be obtained by C. It can also indicate that there is an association relationship between A and B. It should be understood that “correspond” in the description of embodiments of the present disclosure may mean that there is a direct correspondence or an indirect correspondence relationship between the two, may also mean that there is an association relationship between the two, may also be a relationship between indication and being indicated, configuration and being configured, etc. It should also be understood that the "predefined" or "predefined rules" referred to in embodiments of the present disclosure may be implemented by pre-storing corresponding codes, tables, or other manners that may be used to indicate relevant information in devices (e.g., including terminal devices and network devices), the specific implementation of which is not limited by the present disclosure. For example, predefined can refer to what is defined in the protocol. It should also be understood that, in embodiments of the present disclosure, the "protocol" may refer to standard protocols in the communication field, such as LTE protocol, NR protocol, and related protocols applied in future communication systems, which are not limited herein.

In order to facilitate understanding of the technical solution of the embodiments of the present disclosure, related technologies of the embodiments of the present disclosure are described as follows, and the following related technologies can be arbitrarily combined with the technical solution of the embodiments of the present disclosure as an optional solution, all of which belong to the protection scope of the embodiments of the present disclosure.

URLLC/XR

In the future, a support of the 3rd Generation Partnership Project (3GPP) system for vertical industries will be more and more extensive and in-depth. For example, Ultra-Reliable Low-Latency Communications (URLLC) needs to support the transmission of services such as Factory automation, Transport Industry and Electrical Power Distribution in 5G systems. X Radio (XR) needs to support the transmission of services such as an Augmented Reality (AR), a Virtual Reality (VR) and a Cloud gaming. These services have requirements on reliability and delay generally, because when scheduling resources for terminal device, the Quality of Service (QoS) requirements of data transmission must be satisfied. As far as terminal device is concerned, it is also necessary to solve the problem of power consumption of terminal device and avoid unnecessary power consumption. Meanwhile, considering a problem of accessing a large number of terminal devices supporting this type of service, it is necessary to ensure the network capacity when allocating resources.

Typically, URLLC/XR needs to support services with requirement of a minimum delay of 0.5 ms and a reliability of 99.999%. The service may be pseudo-cycle, that is, the arrival time of the service jitter, or the service will arrive at any time within a time range instead of a certain time point. Meanwhile, the service cycle may be a non-integer cycle, such as 16.67 ms. In addition, arrival time of different service flows of the same service may vary greatly.

DRX Mechanism in 5G NR

In 5G NR, a network device may configure a DRX configuration for terminal device, so that the terminal device may perform PDCCH monitoring discontinuously, so as to achieve the purpose of saving power for terminal device. Each Media Access Control (MAC) entity has a DRX configuration. As an example, parameters configured in the DRX configuration include the following.

- DRX ON duration timer (drx-onDurationTimer): used to determine a duration at the beginning of a DRX cycle;
- DRX slot offset (drx-SlotOffset): used to determine the delay before starting the drx-onDurationTimer;
- DRX inactivity timer (drx-InactivityTimer): used to determine a duration after a PDCCH occasion in which the PDCCH has been detected in the PDCCH occasion and the PDCCH indicates a new uplink or downlink transmission;
- downlink DRX retransmission timer (drx-RetransmissionTimerDL): used to determine the maximum duration until a downlink retransmission is received;
- uplink DRX retransmission timer (drx-RetransmissionTimerUL): used to determine the maximum duration until a grant for uplink retransmission is received;
- long DRX cycle start offset (drx-LongCycleStartOffset): used to determine the long DRX cycle and DRX starting time offset (drx-StartOffset), where drx-StartOffset is used to determine the starting time of long DRX cycle and short DRX cycle (for example, a subframe corresponding to the starting time);
- short DRX cycle (drx-ShortCycle): optional configuration, used to determine the short DRX cycle;
- DRX short cycle timer (drx-ShortCycleTimer): optional configuration, used to determine the duration of short DRX cycle, and its value refers to the multiple of short DRX cycle;
- downlink DRX HARQ RTT timer (drx-HARQ-RTT-TimerDL): the minimum duration before a downlink assignment for HARQ retransmission is expected by the MAC entity;
- uplink DRX HARQ RTT timer (drx-HARQ-RTT-TimerUL): the minimum duration before an uplink HARQ retransmission grant is expected by the MAC entity.

If the terminal device is configured with a DRX configuration, the terminal device needs to perform PDCCH monitoring at a DRX activation time (i.e. DRX ON time). The DRX ON time includes the following situations:

1) The running period of any one of the five timers (including drx-onDurationTimer, drx-InactivityTimer, drx-RetransmissionTimerDL, drx-RetransmissionTimerUL and ra-ContentionResolutionTimer) belongs to the DRX ON time.
2) After the terminal device transmits a scheduling request (SR) on the Physical Uplink Control Channel (PUCCH), the period during which the SR is in a pending state belongs to the DRX ON time.
3) During the contention based random access, the period during which the terminal device has not received an initial transmission indicated by the PDCCH scrambled by a C-RNTI after receiving the random access response successfully belongs to the DRX ON time.

The terminal device determines a time to start the drx-onDurationTimer according to whether the current DRX cycle is a short DRX cycle or a long DRX cycle. The specific provisions are as follows:

1> If the short DRX cycle is used, then the sub-frame number of the starting time of drx-onDurationTimer satisfies: [(SFN×10)+subframe number] modulo (drx-ShortCycle)=(drx-StartOffset) modulo (drx-ShortCycle);

1> If the long DRX cycle is used, then the sub-frame number of the starting time of drx-onDurationTimer satisfies: [(SFN×10)+subframe number] modulo (drx-LongCycle)=drx-StartOffset;

2> Start the drx-onDurationTimer at a time after the drx-SlotOffset slot at the beginning of the current subframe.

A condition for the terminal device to start or restart the drx-InactivityTimer is following:

If the terminal device receives a PDCCH indicating a downlink or an uplink initial transmission, the terminal device starts or restarts the drx-InactivityTimer.

Conditions for the terminal device to start and stop drx-RetransmissionTimerDL are following:

When the terminal device has received a PDCCH indicating downlink transmission, or when the terminal device receives a MAC PDU on the configured downlink grant resource, the terminal device stops the drx-Retransmission-TimerDL corresponding to the HARQ process. The terminal device starts the drx-HARQ-RTT-TimerDL corresponding to the HARQ process after completing the transmission of the HARQ process feedback for the downlink transmission.

If the drx-HARQ-RTT-TimerDL corresponding to a certain HARQ process of the terminal device times out and the downlink data transmitted using the HARQ process is unsuccessful in decoding, the terminal device starts the drx-RetransmissionTimerDL corresponding to the HARQ process.

Conditions for the terminal device to start and stop drx-RetransmissionTimerUL are following:

When the terminal device has received a PDCCH indicating uplink transmission, or when the terminal device transmits a MAC PDU on the configured uplink grant resource, the terminal device stops the drx-Retransmission-TimerUL corresponding to the HARQ process. The terminal device starts the drx-HARQ-RTT-TimerUL corresponding to the HARQ process after completing the first repetition of the PUSCH.

If the drx-HARQ-RTT-TimerUL corresponding to a certain HARQ process of the terminal device times out, the terminal device starts the drx-RetransmissionTimerUL corresponding to the HARQ process.

It can be seen from the above DRX mechanism that the terminal device first starts a DRX HARQ RTT timer (drx-HARQ-RTT-TimerUL for uplink transmission and drx-HARQ-RTT-TimerDL for downlink transmission) after completing uplink transmission or HARQ process feedback for downlink transmission. The terminal device is in a sleep state during the operation of the DRX HARQ RTT timer and does not perform PDCCH monitoring. The terminal device starts monitoring uplink retransmission scheduling or determines whether to start monitoring downlink retransmission scheduling according to feedback. Where drx-HARQ-RTT-TimerUL and drx-HARQ-RTT-TimerDL are semi-statically configured by the network device through an RRC signaling.

The DRX configuration configured by the network device for terminal device is for an MAC entity. One MAC entity is configured with only one DRX configuration and only one DRX cycle is in one DRX configuration (this is for long DRX cycle and short DRX cycle respectively, i.e., only one long DRX cycle and only one short DRX cycle). The DRX cycle is measured in ms, and its value is a positive integer value. However, URLLC/XR is not corresponding to services with integer multiple cycle, and there is also the influence of jitter when the service arrives. As a result, when the terminal device needs to monitor the PDCCH of this type of service, the terminal device is in an inactive state, which leads to the failure of monitoring PDCCH, resulting in problems in the scheduling and transmission of services; or when the terminal device does not need to perform PDCCH monitoring, the terminal device is in the active state mistakenly, and unnecessary PDCCH monitoring is performed, resulting in unnecessary power consumption.

In view of this, the following technical solution of the embodiments in the present disclosure is proposed. It should be noted that the technical solution of the embodiments of the present disclosure can be, but is not limited to, applied to the URLLC/XR type service described above. Any type of service is applicable to the technical solution of the embodiments of the present disclosure.

In order to facilitate understanding of the technical solution of the embodiments of the present disclosure, the technical solution of the present disclosure will be described in detail by specific embodiments below. The above related technologies may be combined with the technical solution of the embodiments of the present disclosure arbitrarily as an optional solution, all of which belong to the protection scope of the embodiments of the present disclosure. Embodiments of the present disclosure include at least some of the following.

Figure 2:
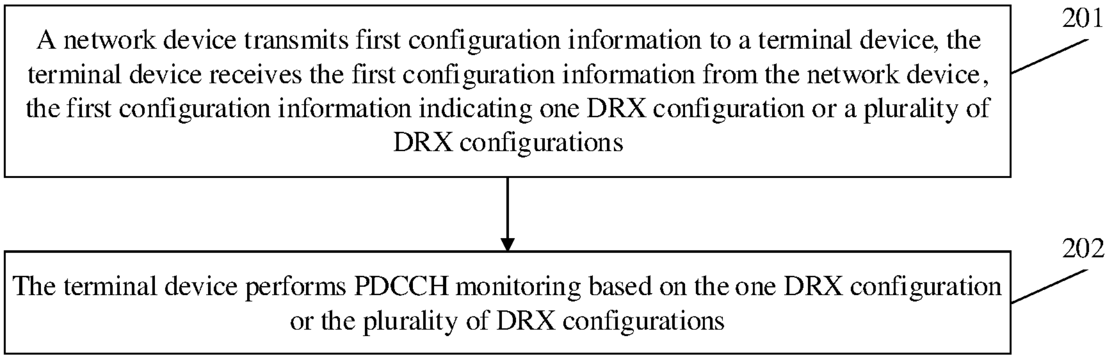
FIG. 2 is a first schematic flowchart of a DRX configuration method provided by an embodiment of the present disclosure.

FIG. 2 is a first schematic flowchart of a DRX configuration method provided by an embodiment of the present disclosure. As illustrated in FIG. 2, the DRX configuration method includes the following operations.

At operation 201, a network device transmits first configuration information to a terminal device, the terminal device receives the first configuration information from the network device, the first configuration information being used to indicate one DRX configuration or a plurality of DRX configurations.

At operation 202, the terminal device performs PDCCH monitoring based on the one DRX configuration or the plurality of DRX configurations.

In some optional implementations, the network device may be a base station.

In the embodiments of the present disclosure, the network device transmits the first configuration information to the terminal device, the first configuration information being used to indicate one DRX configuration or a plurality of DRX configurations, and the one DRX configuration or the plurality of DRX configurations are used for the terminal device to perform PDCCH monitoring.

In some optional implementations, the first configuration information is carried in an RRC signaling. As an example, the one DRX configuration or the plurality of DRX configurations may be configured via an RRC config (such as a DRX-config) in the RRC signaling.

In some optional implementations, the DRX configuration includes configuration information for at least one parameter, the at least one parameter including at least one of the following:

- a first parameter for indicating a long DRX cycle;
- a second parameter for indicating a short DRX cycle;
- a third parameter for indicating a DRX long cycle offset or a starting time of the long DRX cycle; or
- a fourth parameter for indicating a DRX short cycle offset or a starting time of the short DRX cycle.

Further, in some optional implementations, the at least one parameter further includes at least one of:

- a fifth parameter for indicating a duration of a DRX ON duration timer;
- a sixth parameter for indicating a duration of the DRX inactivity timer;
- a seventh parameter for indicating a duration of a DRX retransmission timer;
- an eighth parameter for indicating a duration of the HARQ RTT timer; or
- a ninth parameter for indicating a duration of a DRX short cycle timer.

In some optional implementations, at least one of the third parameter or the fourth parameter is further used to indicate a delayed starting time or an extended running time of at least one of the following timers:

a DRX ON duration timer, a DRX inactivity timer, a DRX retransmission timer, a Hybrid Automatic Repeat-reQuest (HARQ) round trip time (RTT) timer or a DRX short cycle timer.

As an example, an IE corresponding to the first parameter in the above scheme may be "drx-LongCycle", an IE corresponding to the second parameter may be "drx-ShortCycle", an IE corresponding to the third parameter may be "drx-StartOffset", an IE corresponding to the fourth parameter may be "drx-StartOffset", an IE corresponding to the fifth parameter may be "drx-onDurationTimer", an IE corresponding to the sixth parameter may be "drx-InactivityTimer", an IE corresponding to the seventh parameter may be "drx-RetransmissionTimer", an IE corresponding to the eighth parameter may be "drx-HARQ-RTT-Timer", and an IE corresponding to the ninth parameter IE may be "drx-ShortCycleTimer".

Here, the drx-RetransmissionTimer includes two types: uplink and downlink, such as drx-RetransmissionTimer UL and drx-RetransmissionTimer DL, and the drx-HARQ-RTT-Timer includes two types: uplink and downlink, such as drx-HARQ-RTT-Timer UL and drx-HARQ-RTT-Timer DL.

For the case of the plurality DRX configurations, in order to distinguish the same kind of parameters in different DRX configurations, the name of the above-mentioned IE may be modified in different DRX configurations, for example, the IE corresponding to the first parameter may be "drx-LongCycle-ext", the IE corresponding to the second parameter may be "drx-ShortCycle-ext", the IE corresponding to the third parameter may be "drx-StartOffset-ext", the IE corresponding to the fourth parameter may be "drx-StartOffset-ext", the IE corresponding to the fifth parameter may be "drx-onDurationTimer-ext", the IE corresponding to the sixth parameter may be "drx-InactivityTimer-ext", and the seventh parameter The IE corresponding to the parameter may be "drx-RetransmissionTimer-ext", the IE corresponding to the eighth parameter may be "drx-HARQ-RTT-Timer-ext", and the IE corresponding to the ninth parameter may be "drx-ShortCycleTimer-ext".

The technical solution of the embodiments of the present disclosure will be described in different cases in connection with different numbers of DRX configurations configured by the network device.

First Solution

In an embodiment of the present disclosure, the first configuration information is used to indicate a plurality of DRX configurations. Here, the parameters configured in different DRX configurations in the plurality of DRX configurations are different.

Here, the parameters configured in different DRX configurations in the plurality of DRX configurations being different includes in the plurality of DRX configurations, values of at least part of the parameters configured in different DRX configurations are different.

It should be noted that the parameter types configured in different DRX configurations may be exactly the same, or partially the same, or completely different. When a parameter is configured in all plurality of DRX configurations, the values of the parameter are different in the plurality of DRX configurations. Incremental configurations may be performed for configurations of multiple values of the same parameter, that is, a reference value is configured, and then N−1 increments relative to the reference value are configured. N is an integer greater than 1. One increment and one reference value may determine one value of the parameter, and N−1 increments and one reference value may determine N values of the parameter (the reference value may also be used as one value of the parameter). Optionally, absolute values may also be configured directly for the configurations of multiple values of the same parameter.

It is also applicable to the above configuration manner for values of multiple parameters. For the manner of configuring the values of the parameters based on the reference values, the reference values corresponding to different parameters may be different or the same. For example, the plurality of DRX configurations correspond to a plurality of sets of parameters. For configurations of the plurality of sets of parameters, absolute values of each set of parameters may be configured directly, or absolute values may be configured for one set of parameters, while increments relative to the set of parameters are configured for other sets of parameters. Here, optionally, the set of parameters configured with the absolute values may be the first set of parameters or a default set of parameters in the plurality of sets of parameters.

In some optional implementations, each of the plurality of sets of parameters is used to indicate at least one of the following: a DRX long cycle offset, a DRX short cycle offset, a starting time of the long DRX cycle, a starting time of the short DRX cycle, a duration of a long DRX cycle, and a duration of a short DRX cycle. Furthermore, optionally, at least one of the plurality of sets of parameters is further used to indicate a delayed starting time or an extended running time of at least one of the following timers: a DRX ON duration timer, a DRX inactivity timer, a DRX retransmission timer, an HARQ RTT timer or a DRX short cycle timer.

In some optional implementations, each DRX configuration in the plurality of DRX configurations has one DRX configuration index; and/or each DRX configuration in the plurality of DRX configurations has one configuration type identification, the configuration type identification being used to indicate whether the DRX configuration is a common DRX configuration or a regular DRX configuration or a default DRX configuration or an extended DRX configuration.

Here, the common DRX configuration is called common DRX configuration, and the regular DRX configuration is called regular DRX configuration. Both the common DRX and the regular DRX configuration refer to the existing DRX configuration. Although the existing DRX configuration is called the common DRX configuration or the regular DRX configuration in the present disclosure, the name of the existing DRX configuration is not limited in the present disclosure. It should be noted that in the existing DRX configuration, the values of parameters are integer values and the range of values of parameters is fixed. Compared with the existing DRX configuration, in the extended DRX configuration, the values of parameters may be non-integer values and the range of values of parameters is extended. For the default DRX configuration, the DRX configuration is set to be default or used presently or used immediately, and the terminal device may use the DRX configuration for PDCCH monitoring in an event that the terminal device does not receive the DRX configuration indicated by the network device.

In some optional implementations, a first DRX configuration in the plurality of DRX configurations is set as default, or set as used presently, or set as to be used immediately. The first DRX configuration may also be called the default DRX configuration.

As an example, the three DRX configurations configured by the network device are DRX Configuration 1, DRX Configuration 2, and DRX Configuration 3, where DRX Configuration 2 is set to be default or used presently or used immediately.

In some optional implementations, values of at least part of parameters in a first DRX configuration in the plurality of DRX configurations are set to be default or used presently or used immediately.

As an example, the three DRX configurations configured by the network device are DRX Configuration 1, DRX Configuration 2, and DRX Configuration 3, where one or more parameters in DRX Configuration 2 is set to be default or used presently or used immediately.

In some optional implementations, the plurality of DRX configurations are configured by the network device based on first information. Here, the first information is obtained by the network device from the terminal device or the core network or the application layer.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

In some optional implementations, the plurality of DRX configurations are configured for one medium access control (MAC) entity; or the plurality of DRX configurations are configured for one cell group; or the plurality of DRX configurations are configured for all cells or carriers of the one MAC entity; or the plurality of DRX configurations are configured for all cells or carriers of the one cell group.

In the embodiments of the present disclosure, after the terminal device obtains a plurality of DRX configurations configured by the network device, at least one DRX configuration of the plurality of DRX configurations may be used as a DRX configuration for performing PDCCH monitoring, or the plurality of DRX configurations may be jointly used as a DRX configuration for performing PDCCH monitoring. In a case where the terminal device uses at least one of the plurality of DRX configurations for PDCCH monitoring, the terminal device may determine which DRX configuration(s) need to be used for PDCCH monitoring in any of the following manners.

First Manner:

The terminal device determines at least one DRX configuration from the plurality of DRX configurations as a DRX configuration for performing PDCCH monitoring.

In this manner, the terminal device itself determines at least one DRX configuration from the plurality of DRX configurations as a DRX configuration for performing PDCCH monitoring.

In some optional implementations, the terminal device determines at least one DRX configuration from the plurality of DRX configurations based on the first information.

In some optional implementations, the terminal device reports second information to the network device, and the network device receives the second information reported by the terminal device, the second information being used to indicate a DRX configuration determined by the terminal device for performing PDCCH monitoring. Here, optionally, the second information is carried in a MAC CE or UCI or an uplink RRC message.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

Second Manner:

The network device transmits first indication information to the terminal device, the first indication information indicating one of the plurality of DRX configurations, and the terminal device determines at least one DRX configuration from the plurality of DRX configurations based on the first indication information sent by the network device as a DRX configuration for performing PDCCH monitoring. Here, the first indication information is used to indicate at least one of: one DRX configuration index or one configuration type identification, the configuration type identification being used to indicate whether a DRX configuration is a common DRX configuration or a regular DRX configuration or a default DRX configuration or an extended DRX configuration.

In some optional implementations, the first indication information is carried in at least one of the following signalings: an RRC signaling, an MAC CE or downlink control information (DCI).

Third Manner:

The terminal device takes a DRX configuration indicated by the first indication information as a DRX configuration for performing PDCCH monitoring in response to that first indication information sent by the network device is received by the terminal device;

The terminal device takes a first DRX configuration in the plurality of DRX configurations or a presently used DRX configuration as the DRX configuration for PDCCH monitoring in response to that the first indication information sent by the network device is not received by the terminal device. The first DRX configuration is set to be default or used presently or used immediately.

Here, the first indication information is used to indicate at least one of: one DRX configuration index or one configuration type identification, the configuration type identification being used to indicate whether a DRX configuration is a common DRX configuration or a regular DRX configuration or a default DRX configuration or an extended DRX configuration. Optionally, the first indication information is carried in at least one of the following signalings: an RRC signaling, an MAC CE or downlink control information (DCI).

Second Solution

The first configuration information is used to indicate one DRX configuration. The network device transmits second indication information to the terminal device, and the terminal device receives second indication information from the network device, the second indication information being used to indicate to reactivate or update a value of at least one parameter in the one DRX configuration.

In some optional implementations, the second indication information is used to indicate at least one of: a name of a parameter to be reactivated or updated, or an updated value of the parameter to be reactivated or updated. Here, the updated value of the parameter may be an absolute value of the parameter or an increment of the parameter relative to the reference value.

In some optional implementations, the second indication information is carried in at least one of the following signalings: an RRC signaling, an MAC CE or DCI.

In some optional implementations, whether the value of the at least one parameter is to be reactivated or updated is determined by the network device based on first information. Here, the first information is obtained by the network device from the terminal device or a core network or an application layer.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

In the embodiments, after having received the second indication information, immediately or at a first time after a first duration, the terminal device stops use of a present value of the at least one parameter and/or starts use of an updated value of the at least one parameter. Optionally, at least one of the first duration or the first time is configured by the network device or predefined. Here, the present value refers to a value that the terminal device used last before receiving the second indication information.

As an example, the first time may be the first or Mth symbol after the end of the present DRX cycle.

As an example, the first time may be the first or Mth symbol after N cycles of execution according to the present DRX cycle.

As an example, the first time may be the first or Mth symbol after the end of the present DRX ON time.

As an example, the first time may be the first or Mth symbol after the end of the present DRX OFF time.

As an example, the first time may be the first or Mth symbol after a reception time for the second indication information.

In the above example, M is an integer greater than 1 and M is a positive integer.

In the above example, the description of "symbol" may also be replaced by "frame", or "subframe", or "half frame", or "half slot", or "slot".

Third Solution

The first configuration information is used to indicate one DRX configuration. A value of at least one parameter in the one DRX configuration is a non-integer numerical value.

For example, a value of the duration of a DRX related timer is a non-integer value. Here, the DRX related timers include, for example, a DRX ON duration timer, a DRX inactivity timer, a DRX retransmission timer, an HARQ RTT timer or a DRX short cycle timer.

For example, the value of DRX cycle (i.e. long DRX cycle and short DRX cycle) is a non-integer value.

For example, the value of DRX cycle offset (i.e. DRX long cycle offset and DRX short cycle offset) is a non-integer value. Here, the IE corresponding to the DRX cycle offset may be "drx-StartOffset".

In the embodiments, the terminal device determines at least one of: a DRX ON time, a DRX OFF time, a starting time of a DRX related timer or a duration of the DRX related timer based on the DRX configuration. The time domain position corresponding to the DRX ON time is used for PDCCH monitoring.

In some optional implementations, the method further includes at least one of the following:

- the terminal device edge-aligns starting times and/or ending times of the DRX ON time;
- the terminal device edge-aligns starting times and/or ending times of the DRX OFF time;
- the terminal device edge-aligns durations and/or starting times of the DRX related timer;
- the terminal device rounds starting times and/or ending times of the DRX ON time, and determines a time domain position corresponding to the DRX ON time based on a rounded value; and/or
- the terminal device rounds starting times and/or ending times of the DRX OFF time, and determines a time domain position corresponding to the DRX OFF time based on a rounded value;
- the terminal device rounds durations and/or starting times of the DRX related timer, and determines a time domain position corresponding to a running time of the DRX related timer based on a rounded value.

In the above scheme, the rounding is rounding up or rounding down.

In the above scheme, the edge-aligning or rounding is for at least one of a frame boundary, a sub-frame boundary, a slot boundary, a sub-slot boundary or a symbol boundary.

In the above solution, since the values of the parameters in the DRX configuration are non-integer values, the starting time of the DRX ON time, the ending time of the DRX ON time, the starting time of the DRX OFF time, the ending time of the DRX OFF time, the duration of the DRX related timer, and the starting time of the DRX related timer and the time domain unit in the time domain are not aligned, where the slot unit may be, for example, a subframe, a slot or a symbol. Therefore, these times or durations need to be edge-aligned towards the time domain unit, or to be rounded up or down to achieve alignment towards the time domain unit.

Fourth Solution

The first configuration information is used to indicate determining at least one DRX configuration, and the first configuration information is further used to determine a plurality of sets of parameters.

Here, at least one of the plurality of sets of parameters may include only one parameter or may include a plurality of parameters.

Here, each of the plurality of sets of parameters may include only one parameter or may include a plurality of parameters.

By way of example, the plurality of sets of parameters are the plurality of sets of DRX cycle offsets, and each set of DRX cycle offsets includes a DRX long cycle offset and/or a DRX cycle offset, or each set of DRX cycle offsets includes one offset, which is a DRX long cycle offset and/or one DRX cycle offset. Here, the IE corresponding to the DRX cycle offset may be "drx-StartOffset".

The network device may configure multiple values for the same parameter through the plurality of sets of parameters. Incremental configurations may be performed for the configuration of multiple values of the same parameter, and then N−1 increments relative to the reference value are configured. N is an integer greater than 1. One increment and one reference value may determine one value of the parameter, and N−1 increments and one reference value may determine N values of the parameter (the reference value may also be used as one value of the parameter). Optionally, absolute values may also be configured directly for the configurations of multiple values of the same parameter.

In some optional implementations, in the plurality of sets of parameters, a specified set of parameters or a first set of parameters is set to be default or used presently or used immediately.

In some optional implementations, each of the plurality of sets of parameters is used to indicate at least one of:

- a DRX long cycle offset, a DRX short cycle offset, a starting time of the long DRX cycle or a starting time of the short DRX cycle.

In some optional implementations, at least one of the plurality of sets of parameters is further used to indicate a delayed starting time or an extended running time of at least one of the following timers:

- a DRX ON duration timer, a DRX inactivity timer, a DRX retransmission timer, an HARQ RTT timer or a DRX short cycle timer.

In some optional implementations, values of the plurality of sets of parameters are determined by the network device based on first information. Here, the first information is obtained by the network device from the terminal device or the core network or the application layer.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

In the embodiments of the present disclosure, after the terminal device obtains one DRX configuration and a plurality of sets of parameters configured by the network device, the terminal device may use a DRX configuration combined with a set of parameters in the plurality of sets of parameters to perform PDCCH monitoring. The terminal device may determine which set of parameters to use for PDCCH monitoring in any of the following manners.

First Manner:

The terminal device determines a set of parameters for performing PDCCH monitoring from the plurality of sets of parameters.

In this manner, the terminal device itself determines a set of parameters for performing PDCCH monitoring from the plurality of sets of parameters.

In some optional implementations, the terminal device determines the set of parameters for performing PDCCH monitoring from the plurality of sets of parameters based on the first information.

In some optional implementations, the terminal device reports third information to the network device, and the network device receives the third information sent by the terminal device, the third information being used to indicate a set of parameters determined by the terminal device for performing PDCCH monitoring. Here, optionally, the third information is carried in a MAC CE or UCI or an uplink RRC message.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

Second Manner:

The network device transmits third indication information to the terminal device, the third indication information indicating a set of parameters of the plurality of set of parameters, and the terminal device determines a set of parameters from the plurality of set of parameters for performing PDCCH monitoring based on the third indication information sent by the network device. Here, the third indication information is used to indicate at least one of: an index of a set of parameters or one parameter type identification, and the parameter type identification is used to indicate that the set of parameters is common parameters or regular parameters or default parameters or extended parameters.

In some optional implementations, the third indication information is carried in at least one of the following signalings: an RRC signaling, an MAC CE or DCI.

Third Manner:

The terminal device takes a set of parameters indicated by the third indication information as a set of parameters for PDCCH monitoring in response to that the third indication information sent by the network device is received by the terminal device;

The terminal device takes a specified set of parameters or a first set of parameters or a used presently set of parameters as the set of parameters for PDCCH monitoring in response to that the third indication information sent by the network device is not received by the terminal device. The specified set of parameters or the first set of parameters is a set of parameters, which is set to be default or used presently or used immediately, in the plurality of sets of parameters.

Here, the third indication information is used to indicate at least one of: an index of a set of parameters or one parameter type identification, and the parameter type identification is used to indicate that the set of parameters is common parameters or regular parameters or default parameters or extended parameters. Optionally, the third indication information is carried in at least one of the following signalings: an RRC signaling, an MAC CE or downlink control information (DCI).

The technical solution of the embodiments of the present disclosure is illustrated with examples in combination with specific application examples. It should be noted that in the following application examples, the terminal device is UE.

First Application Example

Figure 3:
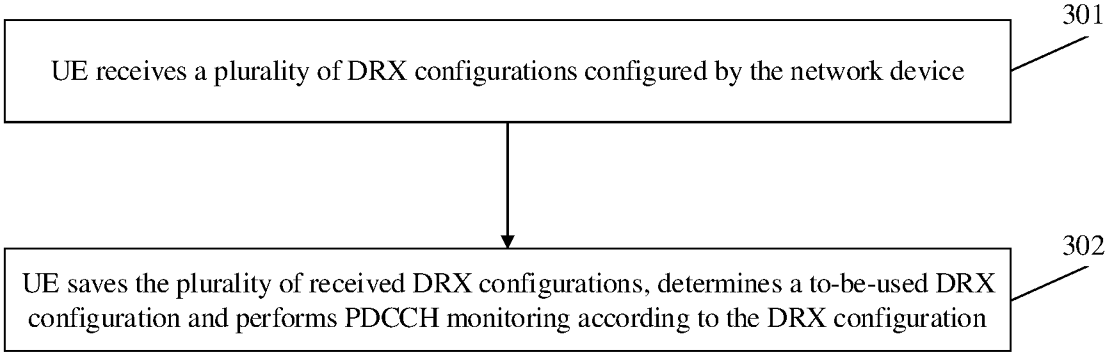
FIG. 3 is a second schematic flowchart of a DRX configuration method provided by an embodiment of the present disclosure.

FIG. 3 is a second schematic flowchart of a DRX configuration method provided by an embodiment of the present disclosure. As illustrated in FIG. 3, the DRX configuration method includes the following operations.

At operation 301, UE receives a plurality of DRX configurations configured by the network device.

In some optional implementations, the plurality of DRX configurations are configured for a MAC entity or for a group of cells.

In some optional implementations, the plurality of DRX configurations are configured for all carriers or cells of a MAC entity, or for all carriers or cells of a group of cells.

In some optional implementations, each DRX configuration in the plurality of DRX configurations has one DRX configuration index and/or one configuration type identification, the configuration type identification being used to indicate whether the DRX configuration is a common DRX configuration or a regular DRX configuration or a default DRX configuration or an extended DRX configuration.

In some optional implementations, one DRX configuration in the plurality of DRX configurations is set to be default or used presently or used immediately.

In some optional implementations, values of at least part of parameters in the plurality of DRX configurations are set to be default or used presently or used immediately.

In some optional implementations, the DRX configuration includes configuration information for at least one parameter, the at least one parameter including at least one of the following: a long DRX cycle, a short DRX cycle, a DRX long cycle offset or a DRX short cycle offset. As an example, the DRX configuration includes at least one of the following IEs: drx-LongCycleStartOffset-Ext, drx-ShortCycle-ext or drx-SlotOffset-ext.

Further, optionally, the at least one parameter further includes at least one of the following: a DRX ON duration timer (drx-onDurationTimer), a DRX inactivity timer (drx-InactivityTimer), a DRX retransmission timer (drx-RetransmissionTimer), a HARQ RTT timer (drx-HARQ-RTT-Timer) or a DRX short cycle timer (drx-ShortCycleTimer).

In some optional implementations, the DRX configuration includes an offset parameter, which may be an offset for a long DRX cycle (for determining a starting time of a long DRX cycle) or an offset for a short DRX cycle (for determining a starting time of a short DRX cycle). Furthermore, optionally, the offset parameter may also be an offset for other DRX parameters, for example, the offset parameter is used to indicate a delayed starting time or an extended running time of at least one of the following timers: a DRX ON duration timer, a DRX inactivity timer, a DRX retransmission timer, an HARQ RTT timer or a DRX short cycle timer.

In some optional implementations, Incremental configurations may be performed for the configuration of multiple values of the same parameter, that is, a reference value is configured, and then N−1 increments relative to the reference value are configured. N is an integer greater than 1. One increment and one reference value may determine one value of the parameter, and N−1 increments and one reference value may determine N values of the parameter (the reference value may also be used as one value of the parameter). Optionally, absolute values may also be configured directly for the configuration of multiple values of the same parameter.

In some optional implementations, the plurality of DRX configurations may be configured via an RRC config (such as a DRX-config) in the RRC signaling.

In some optional implementations, the network device determines whether to configure a plurality of DRX configurations for the UE based on the first information.

Here, the first information comes from UE (e.g. UE assistance information of UE) or a core network or an application layer (e.g. an application server).

Here, the first information is for uplink, or downlink, or uplink and downlink.

Here, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

At operation 302, UE saves a plurality of received DRX configurations, determines a to-be-used DRX configuration and performs PDCCH monitoring according to the DRX configuration.

Here, the operation that the UE performs PDCCH monitoring according to the DRX configuration includes that: the UE determines the DRX ON time and/or the DRX OFF time according to the DRX configuration, the UE performs PDCCH monitoring at the DRX ON time, and stops PDCCH monitoring at the DRX OFF time.

Here, the UE may determine the DRX configuration to be used in any of the following manners:

First manner: UE itself determines which DRX parameter to use or whether to use an extended DRX configuration.

In some optional implementations, the UE determines which DRX configuration to be used or whether to use the extended DRX configuration based on the first information.

Further, optionally, the UE reports to the network device second information, second information is used for indicating that the UE determines one DRX configuration to be used or whether the UE uses an extended DRX configuration.

Second manner: the network device determines that which DRX configuration is used by the UE or determines whether to use the extended DRX configuration according to the first information. The UE determines which DRX configuration to be used or whether to use the extended DRX configuration according to the indication information of the network device.

In some optional implementations, the network device indicates that which DRX configuration is used by the UE, or whether to use the extended DRX configuration through at least one of RRC signaling, DCI or MAC CE.

As an example, the indication information of the network device includes an index of the DRX configuration and/or a configuration type identity. The configuration type identification may be, for example, ext, representing that the network device indicating that the UE uses an extended DRX configuration, and the configuration type identification may be, for example, non-ext, representing that the network device indicating that the UE uses a normal DRX configuration or a regular DRX configuration.

Third manner: under a condition that the UE does not receive the indication information of the network device, the UE uses the existing DRX configuration or does not use the extended DRX configuration.

For example, when the network device does not transmit indication information, the UE uses the existing DRX configuration. When the network device transmits the indication information, the UE uses the extended DRX configuration or the DRX configuration indicated by the indication information.

Fourth manner: UE uses the default DRX configuration when the UE does not receive the indication information of the network device.

Here, in the plurality of DRX configurations, one DRX configuration is configured to be default or used presently or used immediately, and the UE uses the DRX configuration without receiving the indication information from the network device.

In the above solution, in the plurality of DRX configurations, cycle-related parameters and offset-related parameters may be configured independently. Optionally, in multiple DRX configurations, cycle-related parameters may be configured independently, and offset-related parameters may be configured uniformly.

Figure 4:
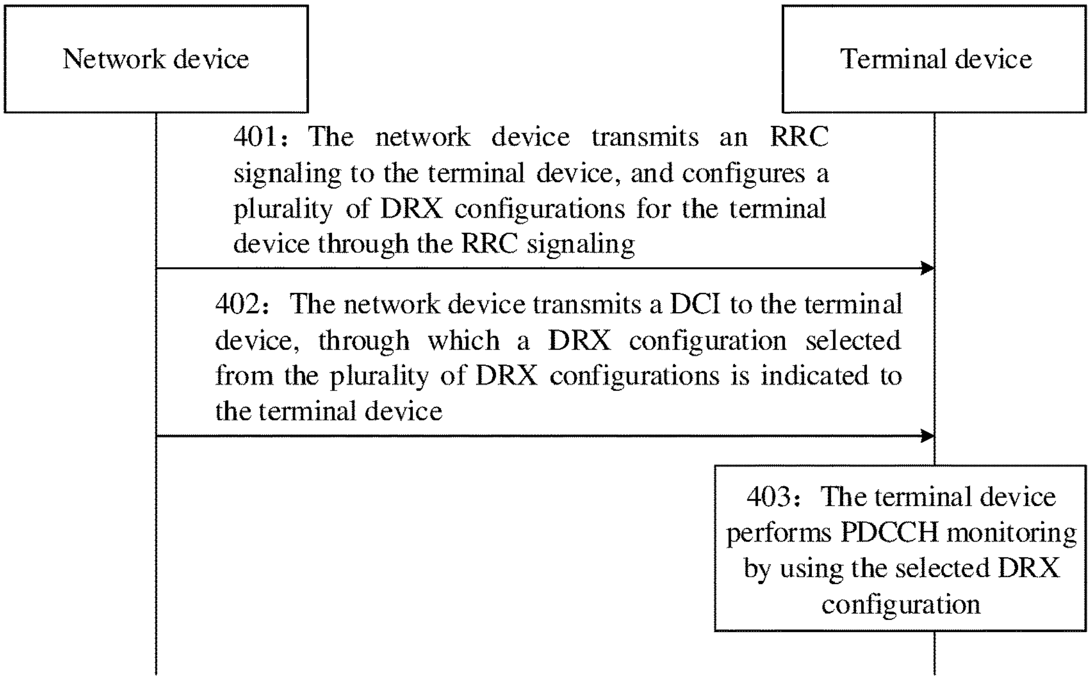
FIG. 4 is a third schematic flowchart of a DRX configuration method provided by an embodiment of the present disclosure.

FIG. 4 is a third schematic flowchart of a DRX configuration method provided by an embodiment of the present disclosure. As illustrated in FIG. 4, the DRX configuration method includes the following operations.

At operation 401, the network device transmits an RRC signaling to the terminal device, and configures a plurality of DRX configurations for the terminal device through the RRC signaling.

At operation 402, the network device transmits a DCI to the terminal device, through which a DRX configuration selected from the plurality of DRX configurations is indicated to the terminal device.

At operation 403, the terminal device performs PDCCH monitoring by using the selected DRX configuration.

According to the technical solution of the embodiments of the present disclosure, for the new service requirement of URLLC/XR, a network device configures a plurality of DRX configurations, and the terminal device can flexibly use a DRX configuration in the plurality of DRX configurations for PDCCH monitoring, thus ensuring the low-delay transmission of the service and avoiding unnecessary power consumption of the UE.

Second Application Example

Figure 5:
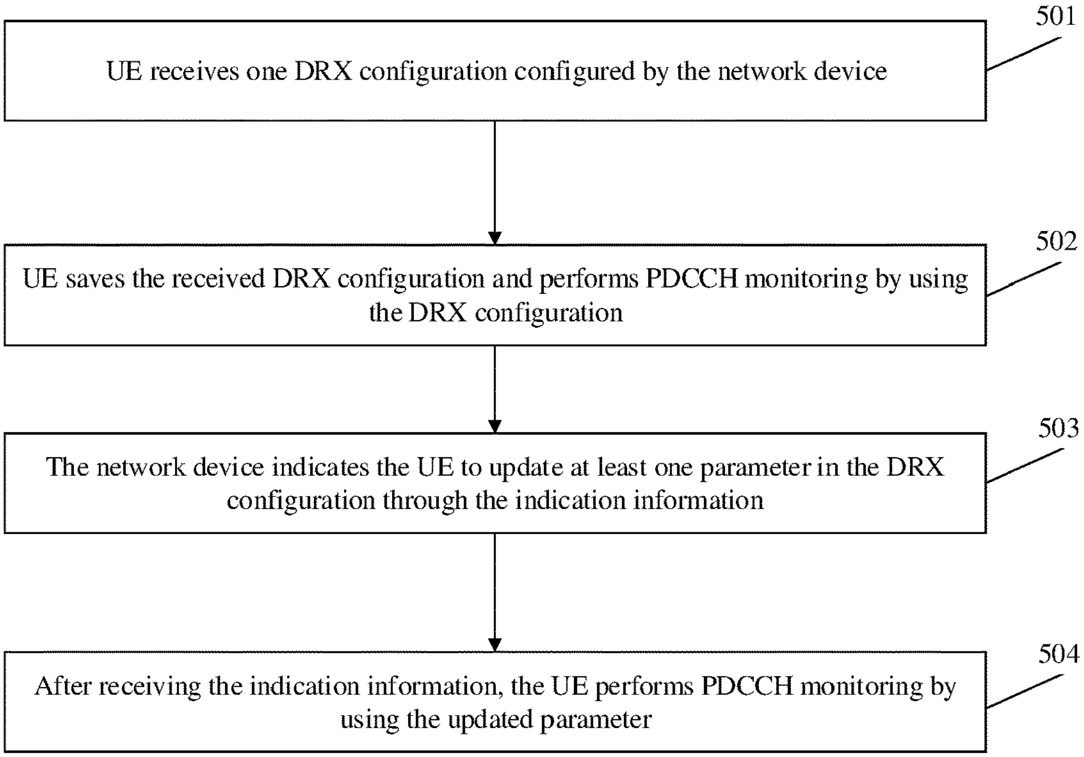
FIG. 5 is a fourth schematic flowchart of a DRX configuration method provided by an embodiment of the present disclosure.

FIG. 5 is a fourth schematic flowchart of a DRX configuration method provided by an embodiment of the present disclosure. As illustrated in FIG. 5, the DRX configuration method includes the following operations.

At operation 501, UE receives one DRX configuration configured by the network device.

In some optional implementations, the one DRX configuration is configured for a MAC entity.

In some optional implementations, the one DRX configuration is configured for all cells or carriers of the MAC entity, or for all cells or carriers of the cell group.

In some optional implementations, the DRX configuration includes configuration information for at least one parameter, the at least one parameter including at least one of the following: a long DRX cycle, a short DRX cycle, a DRX long cycle offset or a DRX short cycle offset. As an example, the DRX configuration includes at least one of the following IEs: drx-LongCycleStartOffset-Ext, drx-ShortCycle-ext or drx-SlotOffset-ext.

Further, optionally, the at least one parameter further includes at least one of the following: a DRX ON duration timer (drx-onDurationTimer), a DRX inactivity timer (drx-InactivityTimer), a DRX retransmission timer (drx-RetransmissionTimer), a HARQ RTT timer (drx-HARQ-RTT-Timer) and a DRX short cycle timer (drx-ShortCycleTimer).

In some optional implementations, the DRX configuration may be configured via an RRC config (such as a DRX-config) in the RRC signaling.

At operation 502, UE saves the received DRX configuration and performs PDCCH monitoring by using the DRX configuration.

Here, the operation that UE performs PDCCH monitoring according to the DRX configuration includes that: the UE determines the DRX ON time and/or the DRX OFF time according to the DRX configuration, the UE performs PDCCH monitoring at the DRX ON time, and stops PDCCH monitoring at the DRX OFF time.

At operation 503, the network device indicates the UE to update at least one parameter in the DRX configuration through the indication information.

In some optional implementations, the network device indicates the UE to update offset parameters in the DRX configuration through indication information, such as DRX long cycle offset, DRX short cycle offset. Another example is to update the starting time or running time of a DRX related timer, here, the DRX related timers include, for example, a DRX ON duration timer, a DRX inactivity timer, a DRX retransmission timer, an HARQ RTT timer or a DRX short cycle timer.

In some optional implementations, the indication information is carried in at least one of the following signalings: an RRC signaling, DCI or an MAC CE.

In some optional implementations, the indication information may include at least one of: a name of a parameter to be updated, or a modified value of the parameter to be updated (which may be an absolute value or an incremental value of the parameter). Optionally, when the updated parameter is only a DRX cycle offset, or when the updated parameter is only a DRX cycle offset and only one of the long DRX cycle and the short DRX cycle is configured, or when the updated parameter is only a DRX cycle offset and the DRX long cycle offset and the DRX short cycle offset are updated simultaneously, the indication information may carry only the modified value and not the name of the parameter.

In some optional implementations, the indication information may include at least one of: a name of a parameter to be updated, or a modified value of the parameter to be updated (which may be an absolute value or an incremental value of the parameter). For example, the parameter to be updated is the starting time or running time of a DRX related timer, here, the DRX related timers include, for example, a DRX ON duration timer, a DRX inactivity timer, a DRX retransmission timer, an HARQ RTT timer or a DRX short cycle timer.

In some optional implementations, the network device determines whether to update parameters in the DRX configuration for the terminal device based on the first information.

Here, the first information comes from UE (e.g. UE assistance information of UE) or a core network or an application layer (e.g. an application server).

Here, the first information is for uplink, or downlink, or uplink and downlink.

Here, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

At operation 504, after receiving the indication information, the UE performs PDCCH monitoring by using the updated parameters.

In some optional implementations, after having received the indication information, immediately or at a first time after a first duration, the UE stops use of a present value of the parameter and/or starts use of an updated value of the parameter.

Here, optionally, at least one of the first duration or the first time is configured by the network device or predefined.

As an example, the first time may be the first or Mth symbol after the end of the present DRX cycle.

As an example, the first time may be the first or Mth symbol after N cycles of execution according to the present DRX cycle.

As an example, the first time may be the first or Mth symbol after the end of the present DRX ON time.

As an example, the first time may be the first or Mth symbol after the end of the present DRX OFF time.

As an example, the first time may be the first or Mth symbol after a reception time for the indication information.

In the above example, M is an integer greater than 1 and M is a positive integer.

In the above example, the description of "symbol" may also be replaced by "frame", or "subframe", or "half frame", or "half slot", or "slot".

Figure 6:
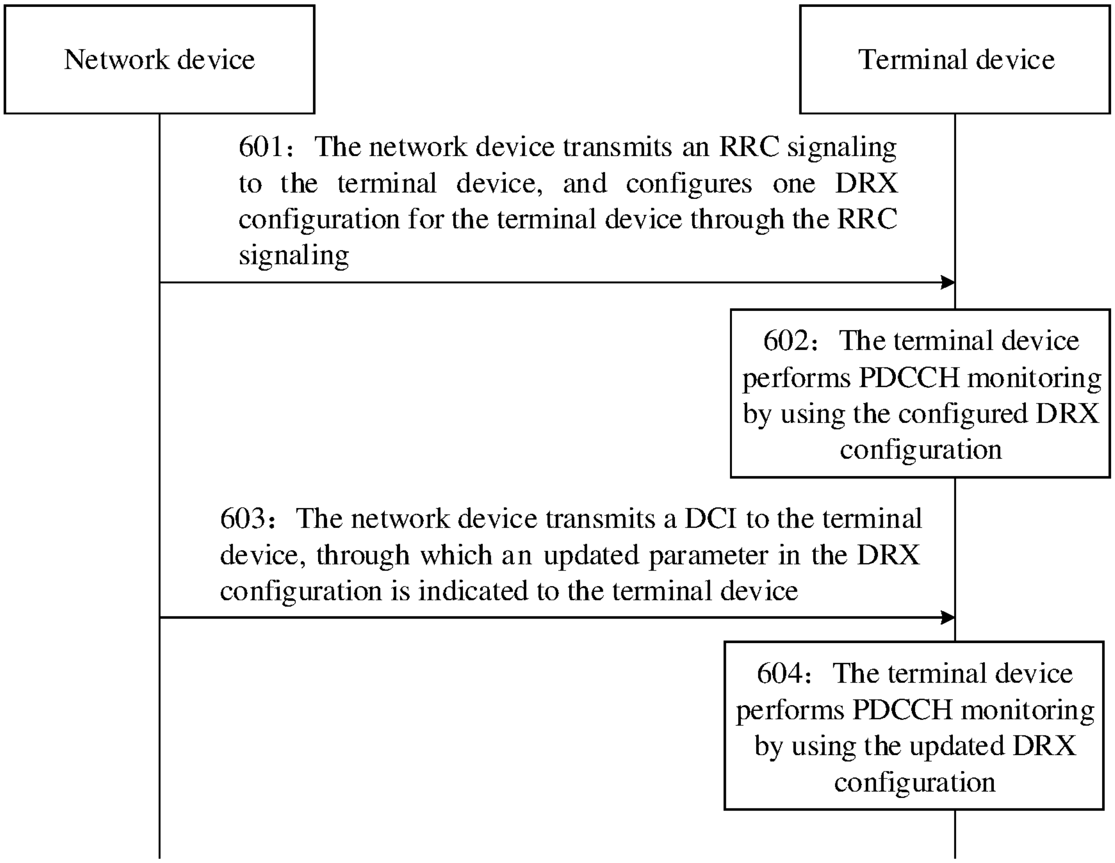
FIG. 6 is a fifth schematic flowchart of a DRX configuration method provided by an embodiment of the present disclosure.

FIG. 6 is a fifth schematic flowchart of a DRX configuration method provided by an embodiment of the present disclosure. As illustrated in FIG. 6, the DRX configuration method includes the following operations.

At operation 601, the network device transmits an RRC signaling to the terminal device, and configures one DRX configuration for the terminal device through the RRC signaling.

At operation 602, the terminal device performs PDCCH monitoring by using the configured DRX configuration.

At operation 603, the network device transmits a DCI to the terminal device, through which an updated parameter in the DRX configuration is indicated to the terminal device.

Here, the parameters in the DRX configuration have been updated, which means that the DRX configuration has been updated.

At operation 604, the terminal device performs PDCCH monitoring by using the updated DRX configuration.

According to the technical solution of the embodiments of the present disclosure, the network device indicates the updated parameters dynamically, thus realizing the flexible update for the DRX configuration, and the mode of updating the DRX configuration can save the signaling overhead effectively.

Third Application Example

Figure 7:
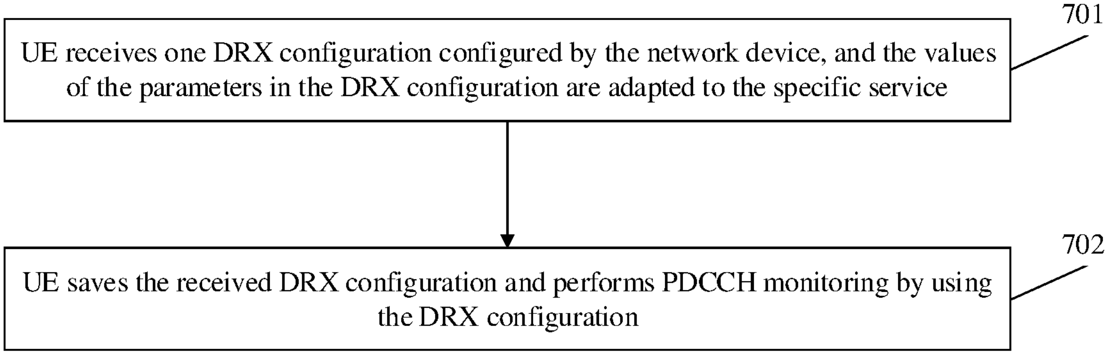
FIG. 7 is a sixth schematic flowchart of a DRX configuration method provided by an embodiment of the present disclosure.

FIG. 7 is a sixth schematic flowchart of a DRX configuration method provided by an embodiment of the present disclosure. As illustrated in FIG. 7, the DRX configuration method includes the following operations.

At operation 701, UE receives one DRX configuration configured by the network device, and the values of the parameters in the DRX configuration are adapted to the specific service.

In some optional implementations, the one DRX configuration is configured for a MAC entity.

In some optional implementations, the one DRX configuration is configured for all cells or carriers of the MAC entity, or for all cells or carriers of the cell group.

In some optional implementations, the DRX configuration includes configuration information for at least one parameter, the at least one parameter including at least one of the following: a long DRX cycle, a short DRX cycle, a DRX long cycle offset or a DRX short cycle offset. As an example, the DRX configuration includes at least one of the following IEs: drx-LongCycleStartOffset-Ext, drx-ShortCycle-ext or drx-SlotOffset-ext.

Further, optionally, the at least one parameter further includes at least one of the following: a DRX ON duration timer (drx-onDurationTimer), a DRX inactivity timer (drx-InactivityTimer), a DRX retransmission timer (drx-RetransmissionTimer), a HARQ RTT timer (drx-HARQ-RTT-Timer) or a DRX short cycle timer (drx-ShortCycleTimer).

In some optional implementations, the DRX configuration may be configured via an RRC config (such as a DRX-config) in the RRC signaling.

Here, a value of at least one parameter in the DRX configuration is a non-integer numerical value.

For example, a value of the duration of a DRX related timer is a non-integer value. Here, the DRX related timers include, for example, a DRX ON duration timer, a DRX inactivity timer, a DRX retransmission timer, an HARQ RTT timer or a DRX short cycle timer.

For example, the value of DRX cycle (i.e. long DRX cycle and short DRX cycle) is a non-integer value.

For example, the value of DRX cycle offset (i.e. DRX long cycle offset and DRX short cycle offset) is a non-integer value. Here, the IE corresponding to the DRX cycle offset may be "drx-StartOffset".

In the above scheme, the values of parameters in DRX configuration are adapted to specific services and meet the requirements of non-integer multiple cycles of specific services. Here, a specific service may be, but is not limited to, a service of URLLC/XR type.

At operation 702, UE saves the received DRX configuration and performs PDCCH monitoring by using the DRX configuration.

Here, the operation that the UE performs PDCCH monitoring according to the DRX configuration includes that: the UE determines the DRX ON time and/or the DRX OFF time according to the DRX configuration, the UE performs PDCCH monitoring at the DRX ON time, and stops PDCCH monitoring at the DRX OFF time.

In the above solution, since the values of the parameters in the DRX configuration are non-integer values, the starting time of the DRX ON time, the ending time of the DRX ON time, the starting time of the DRX OFF time, the ending time of the DRX OFF time, the duration of the DRX related timer, and the starting time of the DRX related timer and the time domain unit in the time domain are not aligned, where the slot unit may be, for example, a subframe, a slot or a symbol. Therefore, these times or durations need to be edge-aligned towards the time domain unit, or to be rounded up or down to achieve alignment towards the time domain unit.

Figure 8:
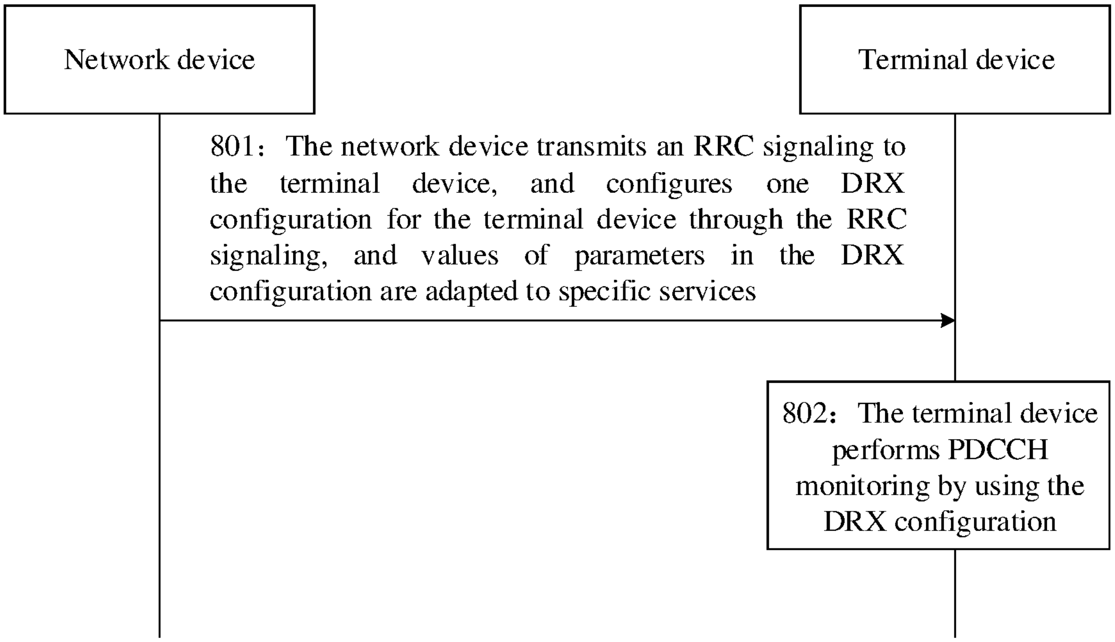
FIG. 8 is a seventh schematic flowchart of a DRX configuration method provided by an embodiment of the present disclosure.

FIG. 8 is a seventh schematic flowchart of a DRX configuration method provided by an embodiment of the present disclosure. As illustrated in FIG. 8, the DRX configuration method includes the following operations.

At operation 801, the network device transmits an RRC signaling to the terminal device, and configures one DRX configuration for the terminal device through the RRC signaling, and values of parameters in the DRX configuration are adapted to specific services.

At operation 802, the terminal device performs PDCCH monitoring by using the DRX configuration.

According to the technical solution of the embodiments of the present disclosure, a specific DRX configuration is configured for a specific service, and the values of parameters in the DRX configuration are adapted to the specific service, so that the implementation is simple, and the terminal device can save energy effectively while receiving specific services normally.

Fourth Application Example

Figure 9:
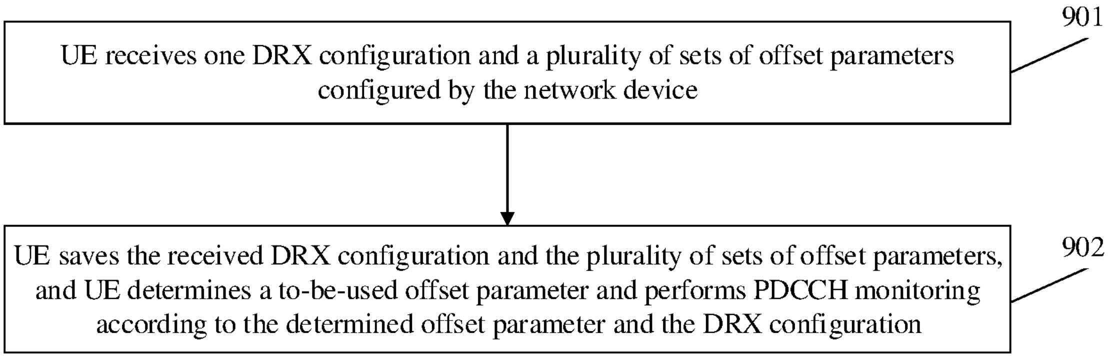
FIG. 9 is an eighth schematic flowchart of a DRX configuration method provided by an embodiment of the present disclosure.

FIG. 9 is an eighth schematic flowchart of a DRX configuration method provided by an embodiment of the present disclosure. As illustrated in FIG. 9, the DRX configuration method includes the following operations.

At operation 901, UE receives one DRX configuration and a plurality of sets of offset parameters configured by the network device.

In some optional implementations, the one DRX configuration is configured for a MAC entity.

In some optional implementations, the one DRX configuration is configured for all cells or carriers of the MAC entity, or for all cells or carriers of the cell group.

In some optional implementations, the DRX configuration includes configuration information for at least one parameter, the at least one parameter including at least one of the following: a long DRX cycle or a short DRX cycle.

Further, optionally, the at least one parameter further includes at least one of the following: a DRX ON duration timer (drx-onDurationTimer), a DRX inactivity timer (drx-InactivityTimer), a DRX retransmission timer (drx-RetransmissionTimer), a HARQ RTT timer (drx-HARQ-RTT-Timer) or a DRX short cycle timer (drx-ShortCycleTimer).

In some optional implementations, the DRX configuration may be configured via an RRC config (such as a DRX-config) in the RRC signaling.

In some optional implementations, each set of the plurality of sets of offset parameters includes a DRX long cycle offset and/or a DRX cycle offset, or each set of offset parameters includes an offset that is a DRX long cycle offset and/or a DRX cycle offset.

The network device may configure multiple values for the offset parameter through the plurality of sets of offset parameters. Incremental configurations may be performed for the configuration of multiple values of the offset parameter, that is, a reference value is configured, and then N−1 increments relative to the reference value are configured. N is an integer greater than 1, one increment and one reference value may determine one value of the parameter, and N−1 increments and one reference value may determine N values of the parameter (the reference value may also be used as one value of the parameter). Optionally, absolute values may also be directly configured for the configurations of multiple values of the offset parameter.

In some optional implementations, in the plurality of sets of offset parameters, a specified set of offset parameters or a first set of offset parameters is set to be default or used presently or used immediately.

In some optional implementations, each of the plurality of sets of offset parameters is used to indicate at least one of:

a DRX long cycle offset, a DRX short cycle offset, a starting time of the long DRX cycle or a starting time of the short DRX cycle.

In some optional implementations, each of the plurality of sets of offset parameters is further used to indicate a delayed starting time or an extended running time of at least one of the following timers:

a DRX ON duration timer, a DRX inactivity timer, a DRX retransmission timer, an HARQ RTT timer or a DRX short cycle timer.

In some optional implementations, the network device determines whether to configure a plurality of sets of offset parameters for the UE based on the first information.

Here, the first information comes from UE (e.g. UE assistance information of UE) or a core network or an application layer (e.g. an application server).

Here, the first information is for uplink, or downlink, or uplink and downlink.

Here, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

At operation 902, UE saves the received DRX configuration and the plurality of sets of offset parameters, and UE determines a to-be-used offset parameter and performs PDCCH monitoring according to the determined offset parameter and the DRX configuration.

Here, the operation that UE performs PDCCH monitoring according to the determined offset parameters and the DRX configuration includes that: UE determines the DRX ON time and/or the DRX OFF time according to the determined offset parameters and the DRX configuration, the UE performs PDCCH monitoring at the DRX ON time, and stops PDCCH monitoring at the DRX OFF time.

Here, the UE may determine the offset parameter to use in any of the following manners:

First manner: UE itself determines which set of offset parameters to use or whether to use extended offset parameters.

In some optional implementations, the UE determines which set of offset parameters to use or whether to use the extended offset parameters based on the first information. Further, optionally, the UE reports to the network device third information, the third information is used for indicating that the UE determines one set of offset parameters to use, or whether the UE uses extended offset parameters.

Second manner: the network device determines that which set of offset parameters is used by the UE or determines whether to use the extended offset parameters according to the first information. The UE determines which set of offset parameters to use or whether to use the extended offset parameters according to the indication information of the network device.

In some optional implementations, the network device indicates that which set of offset parameters is used by the UE, or whether to use the extended set of offset parameters through at least one of RRC signaling, DCI or MAC CE.

As an example, the indication information of the network device includes an index of the offset parameters and/or a parameter type identity. The parameter type identification may be, for example, ext, representing that the network device indicating that the UE uses an extended offset parameters, and the parameter type identification may be, for example, non-ext, representing that the network device indicating that the UE uses a normal offset parameter or a regular offset parameter.

Third manner: under a condition that the UE does not receive the indication information of the network device, the UE uses the existing offset parameter or does not use the extended offset parameter.

For example, when the network device does not transmit indication information, the UE uses the existing offset parameter. When the network device transmits the indication information, the UE uses the extended offset parameter or the offset parameter indicated by the indication information.

Fourth manner: UE uses the default offset parameter when the UE does not receive the indication information of the network device.

Here, in a plurality of sets of offset parameters, a set of offset parameters is configured to be default or used presently or used immediately, and the UE uses the offset parameter without receiving the indication information from the network device.

Figure 10:
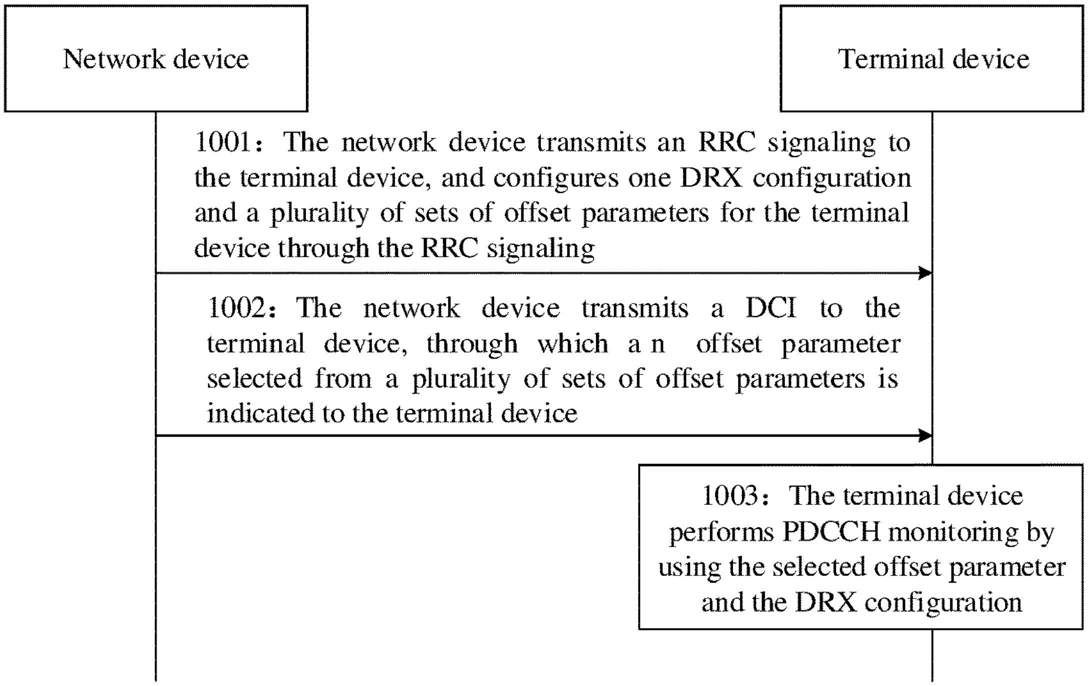
FIG. 10 is a ninth schematic flowchart of a DRX configuration method provided by an embodiment of the present disclosure.

FIG. 10 is a ninth schematic flowchart of a DRX configuration method provided by an embodiment of the present disclosure. As illustrated in FIG. 10, the DRX configuration method includes the following operations.

At operation 1001, the network device transmits an RRC signaling to the terminal device, and configures one DRX configuration and a plurality of sets of offset parameters for the terminal device through the RRC signaling.

At operation 1002, the network device transmits a DCI to the terminal device, through which an offset parameter selected from a plurality of sets of offset parameters is indicated to the terminal device.

At operation 1003, the terminal device performs PDCCH monitoring by using the selected offset parameters and the DRX configuration.

According to the technical solution of the embodiments of the present disclosure, for the new service requirement of URLLC/XR, a network device configures a DRX configuration and a plurality of sets of offset parameters, and the terminal device can flexibly use the offset parameter in the plurality of sets of offset parameters and combine the DRX configuration for PDCCH monitoring, thus ensuring the low-delay transmission of the service and avoiding unnecessary power consumption of the UE. Because only the offset parameter is extended, the signaling overhead is smaller and the behavior of the terminal device is simpler.

As an extended implementation of the technical solution of the embodiments of the present disclosure, considering the coexistence of the existing integer cycle service and the new non-integer cycle service, the network device may configure the DRX configuration for the existing service or the DRX configuration for the new service, where for the existing service and the new service, the DRX configuration and/or the DRB/LCH and other resources corresponding to the parameters in the DRX configuration are different, and the terminal device may determine the DRX configuration used by the service and/or the parameters in the DRX configuration according to the DRB/LCH.

Preferred implementations of the present disclosure have been described in detail with reference to the accompanying drawings, but the present disclosure is not limited to the specific details of the above embodiments. Within the scope of the technical conception of the present disclosure, various simple modifications can be made to the technical solution of the present disclosure, and these simple modifications all belong to the scope of protection of the present disclosure. For example, each of the specific technical features described in the above specific embodiments may be combined in any suitable manner without contradiction, and various possible combinations are not further described in the present disclosure in order to avoid unnecessary repetition. For another example, any combination may be made between the various embodiments of the present disclosure so long as it does not depart from the idea of the present disclosure and is likewise to be regarded as the disclosure of the present disclosure. For another example, on the premise of no conflict, each embodiment described in the present disclosure and/or the technical features in each embodiment can be arbitrarily combined with the related art, and the technical solution obtained after combination should also fall within the scope of protection of the present disclosure.

It should be understood that in various method embodiments of the present disclosure, the size of the sequence number of the above-mentioned processes does not mean the order of execution, and the execution order of each process should be determined by its function and inherent logic, and should not be limited in any way to the implementation process of the embodiments of the present disclosure. Further, in embodiments of the present disclosure, the terms "downlink", "uplink" and "sidelink" are used to denote the transmission direction of the signal or data, where "downlink" is used to denote the transmission direction of the signal or data as a first direction transmitted from the site to the user equipment of the cell, and "uplink" is used to denote the transmission direction of the signal or data as a second direction transmitted from the user equipment of the cell to the site, "sidelink" is used to denote the transmission direction of the signal or data as a first direction transmitted from a user equipment 1 to a user equipment 2. For example, "downlink signal" denotes that the transmission direction of the signal is the first direction. In the present disclosure, the term "and/or" is used to describe an association relationship of associated objects, and represents that there may be three relationships. Specifically, A and/or B may represent the following three situations: i.e., independent existence of A, existence of both A and B and independent existence of B. In addition, the character "/" in the present disclosure generally represents that an "or" relationship is formed between the previous and next associated objects.

Figure 11:
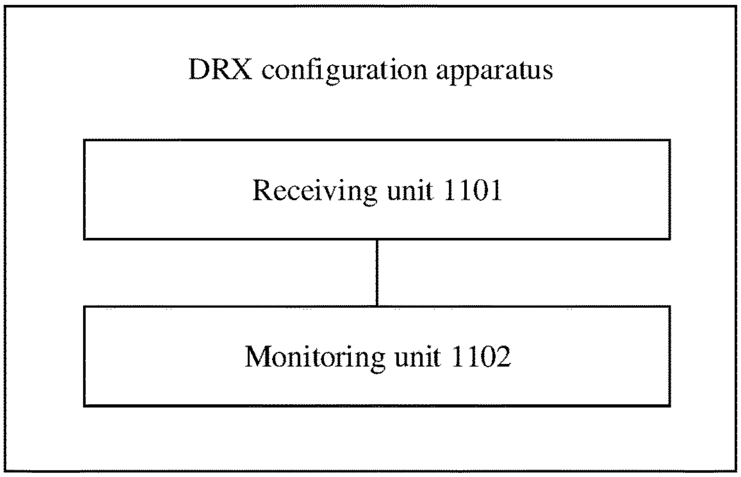
FIG. 11 is a first schematic diagram of a structural composition of a DRX configuration apparatus provided by an embodiment of the present disclosure.

FIG. 11 is a first schematic diagram of a structural composition of a DRX configuration apparatus provided by the embodiment of the present disclosure, and the DRX configuration apparatus is applied to a terminal device. As illustrated in FIG. 11, the DRX configuration apparatus includes a receiving unit 1101, and a monitoring unit 1102.

The receiving unit 1101 is configured to receive first configuration information from a network device, the first configuration information indicating one DRX configuration or a plurality of DRX configurations;

The monitoring unit 1102 is configured to perform physical downlink control channel (PDCCH) monitoring based on the one DRX configuration or the plurality of DRX configurations.

In some optional implementations, the first configuration information is used to indicate the plurality of DRX configurations, and parameters configured in different DRX configurations in the plurality of DRX configurations are different.

In some optional implementations, each DRX configuration in the plurality of DRX configurations has one DRX configuration index; and/or each DRX configuration in the plurality of DRX configurations has one configuration type identification, the configuration type identification being used to indicate whether the DRX configuration is a common DRX configuration or a regular DRX configuration or a default DRX configuration or an extended DRX configuration.

In some optional implementations, the parameters configured in different DRX configurations in the plurality of DRX configurations being different includes:

in the plurality of DRX configurations, values of at least part of the parameters configured in different DRX configurations are different.

In some optional implementations, a first DRX configuration in the plurality of DRX configurations is set to be default or used presently or used immediately.

In some optional implementations, values of at least part of parameters in a first DRX configuration in the plurality of DRX configurations are set to be default or used presently or used immediately.

In some optional implementations, the plurality of DRX configurations are configured by the network device based on first information.

In some optional implementations, the first information is obtained by the network device from the terminal device or a core network or an application layer.

In some optional implementations, the apparatus further includes a determining unit, the determining unit is configured to determine at least one DRX configuration from the plurality of DRX configurations as a DRX configuration for performing PDCCH monitoring.

In some optional implementations, the determining unit is configured to determine the at least one DRX configuration from the plurality of DRX configurations based on first information.

In some optional implementations, the apparatus further includes a transmitting unit, the transmitting unit is configured to report second information to the network device, the second information being used to indicate the DRX configuration determined by the terminal device for performing PDCCH monitoring.

In some optional implementations, the second information is carried in a Media Access Control Control Element (MAC CE) or Uplink Control Information (UCI) or an uplink Radio Resource Control (RRC) message.

In some optional implementations, the apparatus further includes the determining unit, the determining unit is configured to determine, based on first indication information sent by the network device, at least one DRX configuration from the plurality of DRX configurations as a DRX configuration for performing PDCCH monitoring.

In some optional implementations, the apparatus further includes the determining unit, the determining unit is configured to take a DRX configuration indicated by the first indication information as a DRX configuration for performing PDCCH monitoring in response to that first indication information sent by the network device is received by the terminal device; and take a first DRX configuration in the plurality of DRX configurations or a presently used DRX configuration as the DRX configuration for PDCCH monitoring in response to that the first indication information sent by the network device is not received by the terminal device. The first DRX configuration is set to be default or used presently or used immediately.

In some optional implementations, the first indication information is used to indicate at least one of: one DRX configuration index or one configuration type identification, the configuration type identification being used to indicate whether a DRX configuration is a common DRX configuration or a regular DRX configuration or a default DRX configuration or an extended DRX configuration.

In some optional implementations, the first indication information is carried in at least one of the following signalings: an RRC signaling, an MAC CE or downlink control information (DCI).

In some optional implementations, the apparatus further includes the determining unit, the determining unit is configured to take part or all of the plurality of DRX configurations as a DRX configuration for performing PDCCH monitoring.

In some optional implementations, the first configuration information is used to indicate the plurality of DRX configurations, the plurality of DRX configurations are configured for one medium access control (MAC) entity; or the plurality of DRX configurations are configured for one cell group; or the plurality of DRX configurations are configured for all cells or carriers of the one MAC entity; or the plurality of DRX configurations are configured for all cells or carriers of the one cell group.

In some optional implementations, the first configuration information is used to indicate the one DRX configuration, and the receiving unit 1101 is further configured to receive second indication information from the network device, the second indication information being used to indicate to reactivate or update a value of at least one parameter in the one DRX configuration.

In some optional implementations, the second indication information is used to indicate at least one of: a name of a parameter to be reactivated or updated, or an updated value of the parameter to be reactivated or updated.

In some optional implementations, the second indication information is carried in at least one of the following signalings: an RRC signaling, an MAC CE or DCI.

In some optional implementations, whether the value of the at least one parameter is to be reactivated or updated is determined by the network device based on first information.

In some optional implementations, the first information is obtained by the network device from the terminal device or a core network or an application layer.

In some optional implementations, after having received the second indication information, immediately or at a first time after a first duration, the terminal device is configured to stop use of a present value of the at least one parameter and/or start use of an updated value of the at least one parameter.

In some optional implementations, at least one of the first duration or the first time is configured by the network device or predefined.

In some optional implementations, the first configuration information is used to indicate the one DRX configuration, and a value of at least one parameter in the one DRX configuration is a non-integer numerical value.

In some optional implementations, the apparatus further includes the determining unit, the determining unit is configured to determine, based on the DRX configuration, at least one of: a DRX ON time, a DRX OFF time, a starting time of a DRX related timer or a duration of the DRX related timer.

In some optional implementations, the apparatus further includes a processing unit, configured to perform at least one of edge-align at least one of a starting time or an ending time of the DRX ON time;

edge-align at least one of a starting time or an ending time of the DRX OFF time;

edge-align at least one of a duration or a starting time of the DRX related timer;

round at least one of the starting time or the ending time of the DRX ON time, and determine a time domain position corresponding to the DRX ON time based on a rounded value; and/or round at least one of the starting time or the ending time of the DRX OFF time, and determine a time domain position corresponding to the DRX OFF time based on a rounded value;

round at least one of the duration or the starting time of the DRX related timer, and determine a time domain position corresponding to a running time of the DRX related timer based on a rounded value.

In some optional implementations, the rounding is rounding up or rounding down.

In some optional implementations, the edge-aligning or rounding is for at least one of a frame boundary, a sub-frame boundary, a slot boundary, a sub-slot boundary or a symbol boundary.

In some optional implementations, the first configuration information is used to indicate the one DRX configuration, and the first configuration information is further used to determine a plurality of sets of parameters.

In some optional implementations, in the plurality of sets of parameters, a specified set of parameters or a first set of parameters is set to be default or used presently or used immediately.

In some optional implementations, each of the plurality of sets of parameters is used to indicate at least one of a DRX long cycle offset, a DRX short cycle offset, a starting time of the long DRX cycle or a starting time of the short DRX cycle.

In some optional implementations, at least one of the plurality of sets of parameters is further used to indicate a delayed starting time or an extended running time of at least one of the following timers:

a DRX ON duration timer, a DRX inactivity timer, a DRX retransmission timer, a Hybrid Automatic Repeat-reQuest (HARQ) round trip time (RTT) timer or a DRX short cycle timer.

In some optional implementations, values of the plurality of sets of parameters are determined by the network device based on first information.

In some optional implementations, the first information is obtained by the network device from the terminal device or a core network or an application layer.

In some optional implementations, the apparatus further includes the determining unit, the determining unit is configured to determine a set of parameters for performing PDCCH monitoring from the plurality of sets of parameters.

In some optional implementations, the determining unit is configured to determine the set of parameters for performing PDCCH monitoring from the plurality of sets of parameters based on the first information.

In some optional implementations, the apparatus further includes the transmitting unit, the transmitting unit is configured to report third information to the network device, the third information being used to indicate the set of parameters determined by the terminal device for performing PDCCH monitoring.

In some optional implementations, the third information is carried in an MAC CE or UCI or an uplink RRC message.

In some optional implementations, the apparatus further includes the determining unit, the determining unit is configured to determine a set of parameters for performing PDCCH monitoring from the plurality of sets of parameters based on the third indication information sent by the network device.

In some optional implementations, the apparatus further includes the determining unit, the determining unit is configured to take a set of parameters indicated by the third indication information as a set of parameters for PDCCH monitoring in response to that the third indication information sent by the network device is received by the terminal device; and take a specified set of parameters or a first set of parameters or a used presently set of parameters as the set of parameters for PDCCH monitoring in response to that the third indication information sent by the network device is not received by the terminal device. The specified set of parameters or the first set of parameters is a set of parameters, which is set to be default or used presently or used immediately, in the plurality of sets of parameters.

In some optional implementations, the third indication information is used to indicate at least one of: an index of a set of parameters or one parameter type identification, and the parameter type identification is used to indicate that the set of parameters is common parameters or regular parameters or default parameters or extended parameters.

In some optional implementations, the third indication information is carried in at least one of the following signalings: an RRC signaling, an MAC CE or DCI.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

In some optional implementations, the DRX configuration includes configuration information for at least one parameter, the at least one parameter including at least one of the following:

- a first parameter for indicating a long DRX cycle;
- a second parameter for indicating a short DRX cycle;
- a third parameter for indicating a DRX long cycle offset or a starting time of the long DRX cycle; or
- a fourth parameter for indicating a DRX short cycle offset or a starting time of the short DRX cycle.

In some optional implementations, the at least one parameter further includes at least one of:

- a fifth parameter for indicating a duration of a DRX ON duration timer;
- a sixth parameter for indicating a duration of the DRX inactivity timer;
- a seventh parameter for indicating a duration of a DRX retransmission timer;
- an eighth parameter for indicating a duration of the HARQ RTT timer; or
- a ninth parameter for indicating a duration of a DRX short cycle timer.

In some optional implementations, at least one of the third parameter or the fourth parameter is further used to indicate a delayed starting time or an extended running time of at least one of the following timers:

- a DRX ON duration timer, a DRX inactivity timer, a DRX retransmission timer, an HARQ RTT timer or a DRX short cycle timer.

It will be understood by those skilled in the art that the above description of the DRX configuration apparatus of the embodiment of the present disclosure may be understood with reference to the description of the DRX configuration method of the embodiment of the present disclosure.

Figure 12:
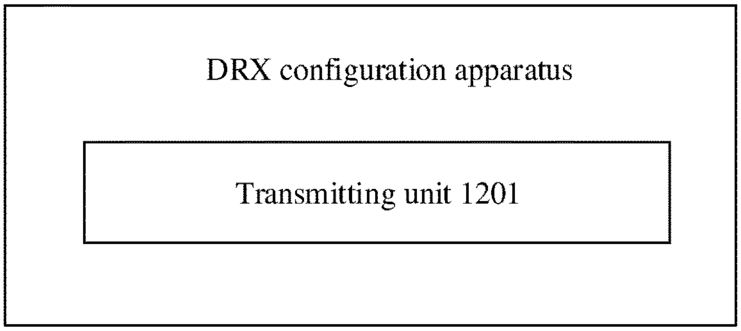
FIG. 12 is a second schematic diagram of a structural composition of a DRX configuration apparatus provided by an embodiment of the present disclosure.

FIG. 12 is a first schematic diagram of a structural composition of a DRX configuration apparatus provided by the embodiment of the present disclosure, and the DRX configuration apparatus is applied to a network device. As illustrated in FIG. 12, the DRX configuration apparatus includes a transmitting unit 1201.

The transmitting unit 1201 is configured to transmit first configuration information to the terminal device, the first configuration information indicating one DRX configuration or a plurality of DRX configurations; where the one DRX configuration or the plurality of DRX configurations are used for performing PDCCH monitoring by the terminal device.

In some optional implementations, the first configuration information is used to indicate the plurality of DRX configurations, and parameters configured in different DRX configurations in the plurality of DRX configurations are different.

In some optional implementations, each DRX configuration in the plurality of DRX configurations has one DRX configuration index; and/or

- each DRX configuration in the plurality of DRX configurations has one configuration type identification, the configuration type identification being used to indicate whether the DRX configuration is a common DRX configuration or a regular DRX configuration or a default DRX configuration or an extended DRX configuration.

In some optional implementations, the parameters configured in different DRX configurations in the plurality of DRX configurations being different includes:

- in the plurality of DRX configurations, values of at least part of the parameters configured in different DRX configurations are different.

In some optional implementations, a first DRX configuration in the plurality of DRX configurations is set to be default or used presently or used immediately.

In some optional implementations, values of at least part of parameters in a first DRX configuration in the plurality of DRX configurations are set to be default or used presently or used immediately.

In some optional implementations, the plurality of DRX configurations are configured by the network device based on first information.

In some optional implementations, the first information is obtained by the network device from the terminal device or a core network or an application layer.

In some optional implementations, the apparatus further includes a receiving unit, the receiving unit is configured to receive the second information reported by the terminal device, the second information being used to indicate the DRX configuration determined by the terminal device for performing PDCCH monitoring.

In some optional implementations, the second information is carried in a MAC CE or UCI or an uplink RRC message.

In some optional implementations, the transmitting unit 1201 is further configured to transmit first indication information to the terminal device, the first indication information being used to indicate one of the plurality of DRX configurations.

In some optional implementations, the first indication information is used to indicate at least one of one DRX configuration index or one configuration type identification, the configuration type identification being used to indicate whether a DRX configuration is a common DRX configuration or a regular DRX configuration or a default DRX configuration or an extended DRX configuration.

In some optional implementations, the first indication information is carried in at least one of the following signalings: an RRC signaling, an MAC CE or downlink control information (DCI).

In some optional implementations, the first configuration information is used to indicate the plurality of DRX configurations, the plurality of DRX configurations are configured for one MAC entity; or the plurality of DRX configurations are configured for one cell group; or the plurality of DRX configurations are configured for all cells or carriers of the one MAC entity; or the plurality of DRX configurations are configured for all cells or carriers of the one cell group.

In some optional implementations, the first configuration information is used to indicate the one DRX configuration, and the transmitting unit 1201 is further configured to transmit second indication information to the terminal device, the second indication information being used to indicate to reactivate or update a value of at least one parameter in the one DRX configuration.

In some optional implementations, the second indication information is used to indicate at least one of: a name of a parameter to be reactivated or updated, or an updated value of the parameter to be reactivated or updated.

In some optional implementations, whether the value of the at least one parameter is to be reactivated or updated is determined by the network device based on first information.

In some optional implementations, the first information is obtained by the network device from the terminal device or a core network or an application layer.

In some optional implementations, the first configuration information is used to indicate the one DRX configuration, and a value of at least one parameter in the one DRX configuration is a non-integer numerical value.

In some optional implementations, the first configuration information is used to indicate the one DRX configuration, and the first configuration information is further used to determine a plurality of sets of parameters.

In some optional implementations, in the plurality of sets of parameters, a specified set of parameters or a first set of parameters is set to be default or used presently or used immediately.

In some optional implementations, each of the plurality of sets of parameters is used to indicate at least one of.

a DRX long cycle offset, a DRX short cycle offset, a starting time of the long DRX cycle or a starting time of the short DRX cycle.

In some optional implementations, each of the plurality of sets of parameters is further used to indicate a delayed starting time or an extended running time of at least one of the following timers:

a DRX ON duration timer, a DRX inactivity timer, a DRX retransmission timer, an HARQ RTT timer or a DRX short cycle timer.

In some optional implementations, values of the plurality of sets of parameters are determined by the network device based on first information.

In some optional implementations, the first information is obtained by the network device from the terminal device or a core network or an application layer.

In some optional implementations, the apparatus further includes a receiving unit, the receiving unit is configured to receive third information from the terminal device, the third information being used to indicate the set of parameters determined by the terminal device for performing PDCCH monitoring.

In some optional implementations, the third information is carried in an MAC CE or UCI or an uplink RRC message.

In some optional implementations, the transmitting unit 1201 is further configured to transmit third indication information to the terminal device, the third indication information being used for indicating a set of parameters in the plurality of sets of parameters.

In some optional implementations, the third indication information is used to indicate at least one of: an index of a set of parameters or one parameter type identification, and the parameter type identification is used to indicate that the set of parameters is common parameters or regular parameters or default parameters or extended parameters.

In some optional implementations, the third indication information is carried in at least one of the following signalings: an RRC signaling, an MAC CE or DCI.

In some optional implementations, the first information includes at least one of: a service packet transmission cycle, a service packet arrival time, an earliest service packet arrival time, a latest service packet arrival time, a jitter of the service packet, a jitter range of the service packet, a service arrival time or a service arrival time pattern.

In some optional implementations, the DRX configuration includes configuration information for at least one parameter, the at least one parameter including at least one of the following:

a first parameter for indicating a long DRX cycle;

a second parameter for indicating a short DRX cycle;

a third parameter for indicating a DRX long cycle offset or a starting time of the long DRX cycle; or a fourth parameter for indicating a DRX short cycle offset or a starting time of the short DRX cycle.

In some optional implementations, the at least one parameter further includes at least one of:

a fifth parameter for indicating a duration of a DRX ON duration timer;

a sixth parameter for indicating a duration of the DRX inactivity timer;

a seventh parameter for indicating a duration of a DRX retransmission timer;

an eighth parameter for indicating a duration of the HARQ RTT timer; or a ninth parameter for indicating a duration of a DRX short cycle timer.

In some optional implementations, at least one of the third parameter or the fourth parameter is further used to indicate a delayed starting time or an extended running time of at least one of the following timers:

a DRX ON duration timer, a DRX inactivity timer, a DRX retransmission timer, an HARQ RTT timer or a DRX short cycle timer.

It will be understood by those skilled in the art that the above description of the DRX configuration apparatus of the embodiment of the present disclosure may be understood with reference to the description of the DRX configuration method of the embodiment of the present disclosure.

Figure 13:
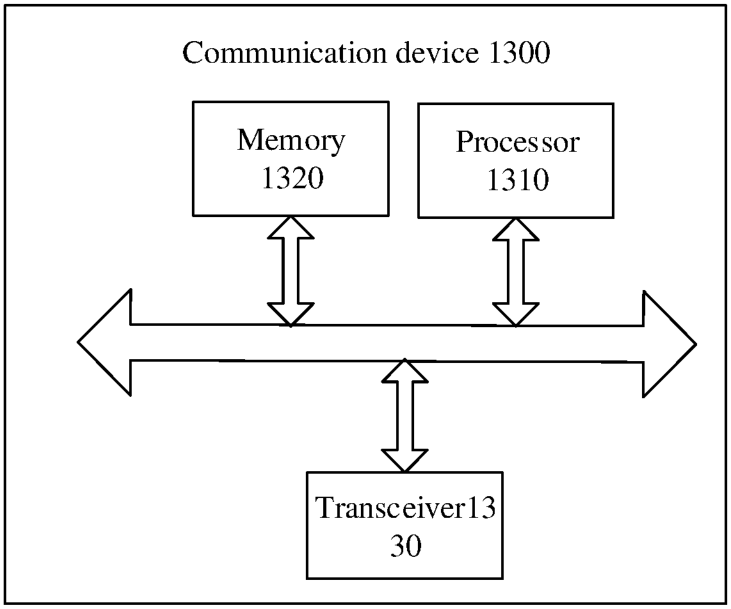
FIG. 13 is a schematic structural diagram of a communication device provided by an embodiment of the present disclosure.

FIG. 13 is a schematic structural diagram of a communication device 1300 provided by an embodiment of the present disclosure. The communication device may be a terminal device or a network device. A communication device 1300 illustrated in FIG. 13 includes a processor 1310 that may call and execute a computer program from a memory to implement the method in an embodiment of the present disclosure.

Optionally, as illustrated in FIG. 13, the communication device 1300 may also include a memory 1320. The processor 1310 may call and execute a computer program from the memory 1320 to implement the method in the embodiments of the present disclosure.

The memory 1320 may be a separate device independent of the processor 1310 or may be integrated in the processor 1310.

As illustrated in FIG. 13, the communication device 1300 may also include a transceiver 1330. The processor 1310 may control the transceiver 1330 to communicate with other devices, and in particular send information or data to other devices, or receive information or data sent by other devices.

The transceiver 1330 may include a transmitter and a receiver. The transceiver 1330 may further include antennas. The number of antennas may be one or more.

Optionally, the communication device 1300 may be specifically the network device of the embodiments of the present disclosure, and the communication device 1300 may implement corresponding processes implemented by the network device in the respective methods of the embodiments of the present disclosure, which will not be repeated here for the sake of brevity.

Optionally, the communication device 1300 may be specifically a mobile terminal/terminal device of the embodiments of the present disclosure, and the communication device 1300 may implement corresponding processes implemented by the mobile terminal/the terminal device in various methods of the embodiments of the present disclosure, which will not be repeated here for the sake of brevity.

Figure 14:
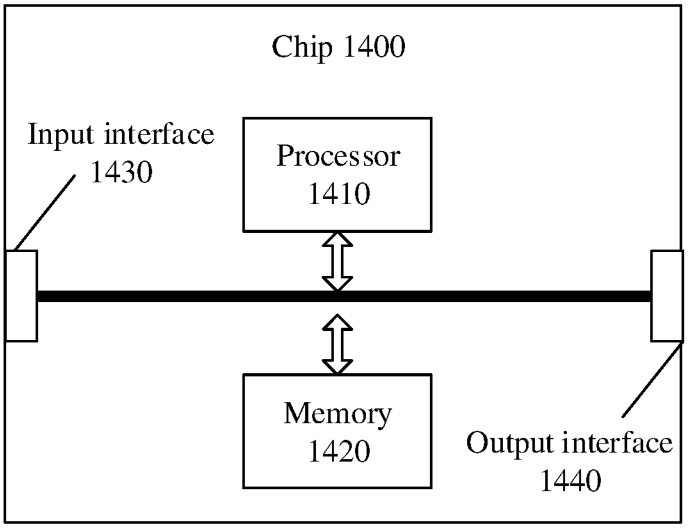
FIG. 14 is a schematic structural diagram of a chip according to an embodiment of the present disclosure.

FIG. 14 is a schematic structural diagram of a chip according to an embodiment of the present disclosure. A chip 1400 illustrated in FIG. 14 includes a processor 1410 that may call and execute a computer program from memory to implement the method in an embodiment of the present disclosure.

Optionally, as illustrated in FIG. 14, the chip 1400 may also include a memory 1420. The processor 1410 may call and execute a computer program from memory 1420 to implement the method in the embodiments of the present disclosure.

The memory 1420 may be a separate device independent of the processor 1410 or may be integrated in the processor 1410.

Optionally, the chip 1400 may also include an input interface 1430. The processor 1410 may control the input interface 1430 to communicate with other devices or chips, and in particular obtain information or data sent by other devices or chips.

Optionally, the chip 1400 may also include an output interface 1440. The processor 1410 may control the output interface 1440 to communicate with other devices or chips, and in particular output information or data to other devices or chips.

Optionally, the chip may applied to be a network device of the embodiments of the present disclosure, and the chip may implement corresponding processes implemented by the network device in various methods of the embodiments of the present disclosure, which will not be repeated here for the sake of brevity.

Optionally, the chip may applied to be a mobile terminal/terminal device of an embodiment of the present disclosure, and the chip may implement corresponding processes implemented by the mobile terminal/the terminal device in the respective methods of the embodiments of the present disclosure, which will not be repeated here for the sake of brevity.

It should be understood that the chip referred to in the embodiments of the present disclosure may also be referred to as a system-level chip, a system chip, a chip system or a system-on-chip or the like.

Figure 15:
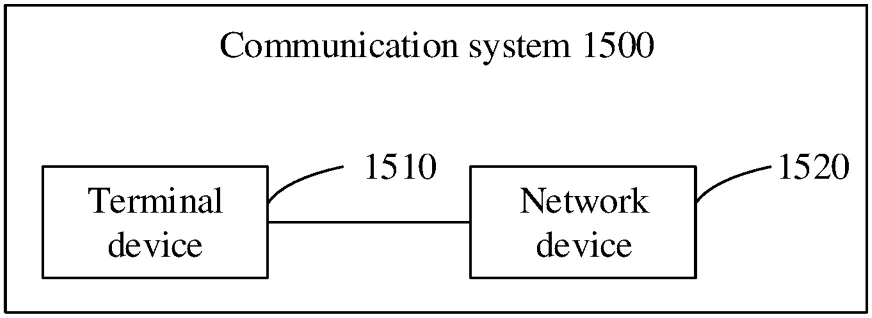
FIG. 15 is a schematic block diagram of a communication system provided by an embodiment of the present disclosure.

FIG. 15 is a schematic block diagram of a communication system 1500 provided by an embodiment of the present disclosure. As illustrated in FIG. 15, the communication system 1500 includes a terminal device 1510 and a network device 1520.

The terminal device 1510 may be configured to implement corresponding functions implemented by the terminal device in the above method, and the network device 1520 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in the embodiments of the present disclosure. The general purpose processor may be a microprocessor or any conventional processor. The operations of the method disclosed in the embodiments of the present disclosure may be directly embodied as being executed by a hardware decoding processor or being executed by the hardware and software modules in a decoding processor. The software modules may be located in a random access memory, a flash memory, a read-only memory, a programmable read-only memory or an electrically erasable programmable memory, a register and other mature storage media in the art. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory in the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

Optionally, the computer-readable storage medium may applied to the network device of the embodiments of the present disclosure, and the computer program causes a computer to implement corresponding processes implemented by the network device in the methods of the embodiments of the present disclosure, which will not be repeated here for the sake of brevity.

Optionally, the computer-readable storage medium may applied to the mobile terminal/terminal device of the embodiments of the present disclosure, and the computer program causes a computer to implement corresponding processes implemented by the mobile terminal/terminal device in the methods of the embodiments of the present disclosure, which will not be repeated here for the sake of brevity.

In an embodiment of the present disclosure, there is further provided a computer program product, which includes computer program instructions.

Optionally, the computer program product may applied to the network device of the embodiments of the present disclosure, and the computer program instructions cause a computer to implement corresponding processes implemented by the network device in the methods of the embodiments of the present disclosure, which will not be repeated here for the sake of brevity.

Optionally, the computer program product may applied to the mobile terminal/terminal device of the embodiments of the present disclosure, and the computer program instructions causes a computer to implement corresponding processes implemented by the mobile terminal/terminal device in the methods of the embodiments of the present disclosure, which will not be repeated here for the sake of brevity.

In an embodiment of the present disclosure, there is further provided a computer program.

Optionally, the computer program may applied to the network device of the embodiments of the present disclosure, the computer program, when running on a computer, causes the computer to implement corresponding processes implemented by the network device in the methods of the embodiments of the present disclosure, which will not be repeated here for the sake of brevity.

Optionally, the computer program may applied to the mobile terminal/terminal device of the embodiments of the present disclosure, the computer program, when running on a computer, causes the computer to implement corresponding processes implemented by the mobile terminal/terminal device in the methods of the embodiments of the present disclosure, which will not be repeated here for the sake of brevity.

Those of ordinary skill in the art may realize that the various example units and algorithm steps described in connection with the embodiments disclosed herein may be implemented in electronic hardware or a combination of computer software and electronic hardware. Whether these functions are performed in hardware or software depends on the specific application and design constraints of the technical solution. Professionals may use different methods for each particular application to implement the described functionality, but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, each functional unit in each embodiment of the present disclosure may be integrated in one processing unit, each unit may exist physically alone, or two or more units may be integrated in one unit.

When the functions are realized in the form of software functional units and sold or used as an independent product, they may be stored in a computer readable storage medium. Based on such an understanding, the technical solutions according to the disclosure, in essence or the part contributing to the prior art, or part of the technical solutions may be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art may easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A discontinuous reception (DRX) configuration method, comprising:

receiving, by a terminal device, first configuration information from a network device, wherein the first configuration information indicates one DRX configuration;

performing, by the terminal device, physical downlink control channel (PDCCH) monitoring based on the one DRX configuration;

wherein a value of at least one parameter in the one DRX configuration is a non-integer numerical value, and the method further comprises:

determining, by the terminal device based on the one DRX configuration, a starting time of a DRX related timer;

wherein the method further comprises:

rounding, by the terminal device, the starting time of the DRX related timer, and determining, by the terminal device, a time domain position corresponding to a running time of the DRX related timer based on a rounded value;

wherein the rounding is rounding down, and the rounding is for a sub-frame boundary.

2. The method of claim 1, wherein the first configuration information is further used to determine a plurality of sets of parameters.

3. The method of claim 2, wherein each of the plurality of sets of parameters is used to indicate at least one of:

a DRX long cycle offset, a DRX short cycle offset, a starting time of a long DRX cycle or a starting time of a short DRX cycle.

4. The method of claim 2, wherein values of the plurality of sets of parameters are determined by the network device based on first information.

5. The method of claim 4, wherein the first information comprises at least one of: a service packet transmission cycle, a service packet arrival time, an earliest service packet arrival time, a latest service packet arrival time, a jitter of the service packet, a jitter range of the service packet, a service arrival time or a service arrival time pattern.

6. The method of claim 1, wherein the one DRX configuration comprises configuration information for at least one parameter, the at least one parameter comprising at least one of the following:

a first parameter for indicating a long DRX cycle;

a second parameter for indicating a short DRX cycle;

a third parameter for indicating a DRX long cycle offset or a starting time of the DRX long cycle; or a fourth parameter for indicating a DRX short cycle offset or a starting time of the short DRX cycle.

7. The method of claim 1, wherein the at least one parameter is for a long DRX cycle and a short DRX cycle.

8. A terminal device, comprising: a processor and a memory for storing a computer program, wherein the processor implements the computer program to cause the terminal device at least to:

receive first configuration information from a network device, wherein the first configuration information indicates one DRX configuration; and perform physical downlink control channel (PDCCH) monitoring based on the one DRX configuration;

wherein a value of at least one parameter in the one DRX configuration is a non-integer numerical value, and the processor further causes the terminal device to:

determine, based on the one DRX configuration, a starting time of a DRX related timer;

wherein the processor further causes the terminal device to:

round the starting time of the DRX related timer, and determine a time domain position corresponding to a running time of the DRX related timer based on a rounded value;

wherein the rounding is rounding down, and the rounding is for a sub-frame boundary.

9. The terminal device of claim 8, wherein the at least one parameter is for a long DRX cycle and a short DRX cycle.

10. The terminal device of claim 8, wherein the first configuration information is further used to determine a plurality of sets of parameters.

11. The terminal device of claim 10, wherein each of the plurality of sets of parameters is used to indicate at least one of:

a DRX long cycle offset, a DRX short cycle offset, a starting time of a long DRX cycle or a starting time of a short DRX cycle.

12. The terminal device of claim 10, wherein values of the plurality of sets of parameters are determined by the network device based on first information.

13. The terminal device of claim 12, wherein the first information comprises at least one of: a service packet transmission cycle, a service packet arrival time, an earliest service packet arrival time, a latest service packet arrival time, a jitter of the service packet, a jitter range of the service packet, a service arrival time or a service arrival time pattern.

14. A network device, comprising: a processor and a memory for storing a computer program, wherein the processor implements the computer program to cause the network device at least to:

transmit first configuration information to a terminal device, wherein the first configuration information indicates one DRX configuration, and the one DRX configuration is used for performing physical downlink control channel (PDCCH) monitoring by the terminal device;

wherein a value of at least one parameter in the one DRX configuration is a non-integer numerical value, and the one DRX configuration is used by the terminal device to determine a starting time of a DRX related timer, and the starting time of the DRX related timer is rounded down by the terminal device, wherein the rounding is for a sub-frame boundary.

15. The network device of claim 14, wherein the first configuration information is further used to determine a plurality of sets of parameters.

16. The network device of claim 15, wherein each of the plurality of sets of parameters is used to indicate at least one of:

a DRX long cycle offset, a DRX short cycle offset, a starting time of a long DRX cycle or a starting time of a short DRX cycle.

17. The network device of claim 15, wherein values of the plurality of sets of parameters are determined by the network device based on first information.

18. The network device of claim 17, wherein the first information comprises at least one of: a service packet transmission cycle, a service packet arrival time, an earliest service packet arrival time, a latest service packet arrival time, a jitter of the service packet, a jitter range of the service packet, a service arrival time or a service arrival time pattern.

19. The network device of claim 14, wherein the one DRX configuration comprises configuration information for at least one parameter, the at least one parameter comprising at least one of the following:

a first parameter for indicating a long DRX cycle;

a second parameter for indicating a short DRX cycle;

a third parameter for indicating a DRX long cycle offset or a starting time of the long DRX cycle; or a fourth parameter for indicating a DRX short cycle offset or a starting time of the short DRX cycle.

20. The network device of claim 14, wherein the at least one parameter is for a long DRX cycle and a short DRX cycle.

* * * * *